United States Patent [19]

Someya

[11] Patent Number: 4,980,706

[45] Date of Patent: Dec. 25, 1990

[54] IMAGE PROCESSOR WITH PARTIAL IMAGE SIZE ZOOMING AND METHOD OF PARTIAL IMAGE PROCESSING

[75] Inventor: Akihiko Someya, Yokohama, Japan

[73] Assignee: Kabushiki Kaisha Toshiba, Kawasaki, Japan

[21] Appl. No.: 426,566

[22] Filed: Oct. 25, 1989

[30] Foreign Application Priority Data

Oct. 31, 1988 [JP] Japan ............................... 63-275647

[51] Int. Cl.[5] ........................ G03G 21/00; H04N 1/21

[52] U.S. Cl. ..................................... 346/160; 358/296

[58] Field of Search ................ 355/214, 218; 358/296, 358/300; 346/154, 153.1, 160

[56] References Cited

U.S. PATENT DOCUMENTS

| | | | |
|---|---|---|---|
| 4,740,814 | 4/1988 | Folkins | 355/214 X |
| 4,763,165 | 8/1988 | Watanabe | 346/160 X |
| 4,788,599 | 11/1988 | Sugishima | 358/296 |
| 4,860,049 | 8/1989 | Toshimitsu et al. | 355/218 |

*Primary Examiner*—Donald A. Griffin

*Attorney, Agent, or Firm*—Foley & Lardner, Schwartz, Jeffery, Schwaab, Mack, Blumenthal & Evans

[57] ABSTRACT

An image processor of this invention includes a designating unit for designating a prescribed region of a manuscript, a setting unit for setting an image formation magnification/reduction rate (or image modification rate) for the prescribed region designated by the designating unit, a first image forming unit for forming a manuscript image at a portion corresponding to the prescribed region designated by the designating unit on an image forming media in accordance with the image formation magnification/reduction rate (modification rate) set by the setting unit, and a second image forming unit for forming a manuscript image in a one-to-one correspondence with a manuscript image at a portion corresponding to a region other than the prescribed region designated by the designating unit on the image forming media. The image processor further includes an instructing unit for instructing an image formation location, on the image forming media, of the manuscript image at the portion corresponding to the prescribed region designated by the designating unit.

18 Claims, 19 Drawing Sheets

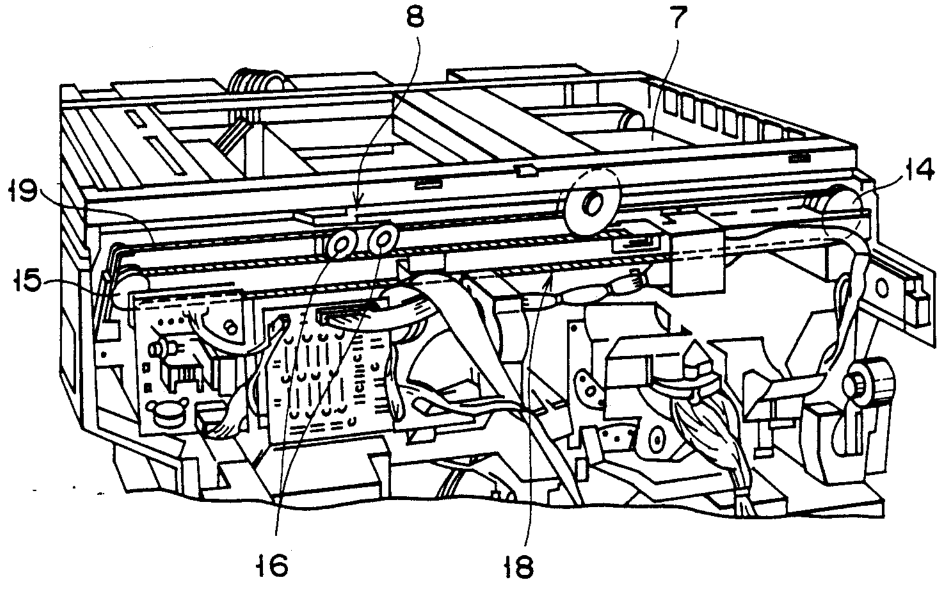
F I G. 6

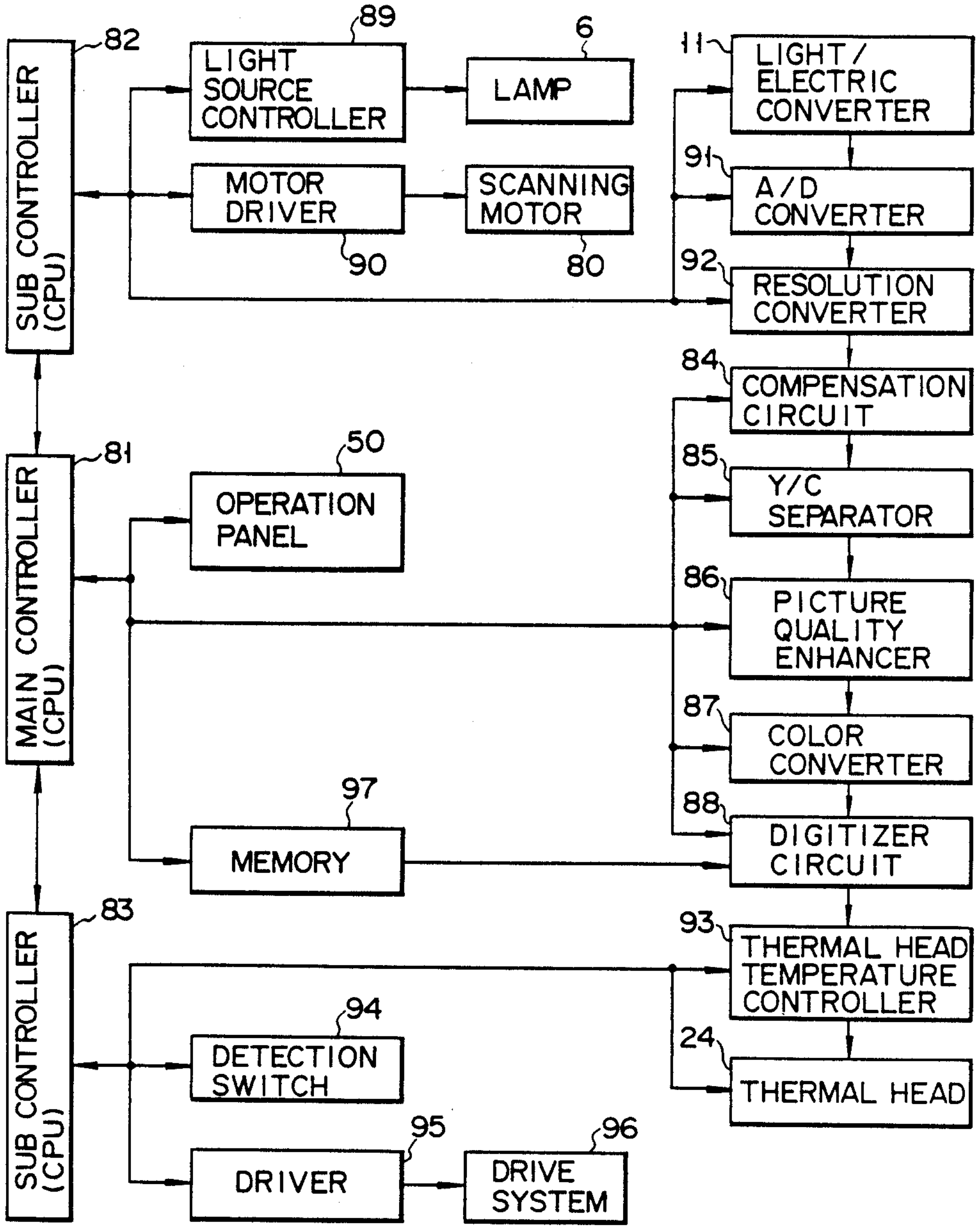
F I G. 14

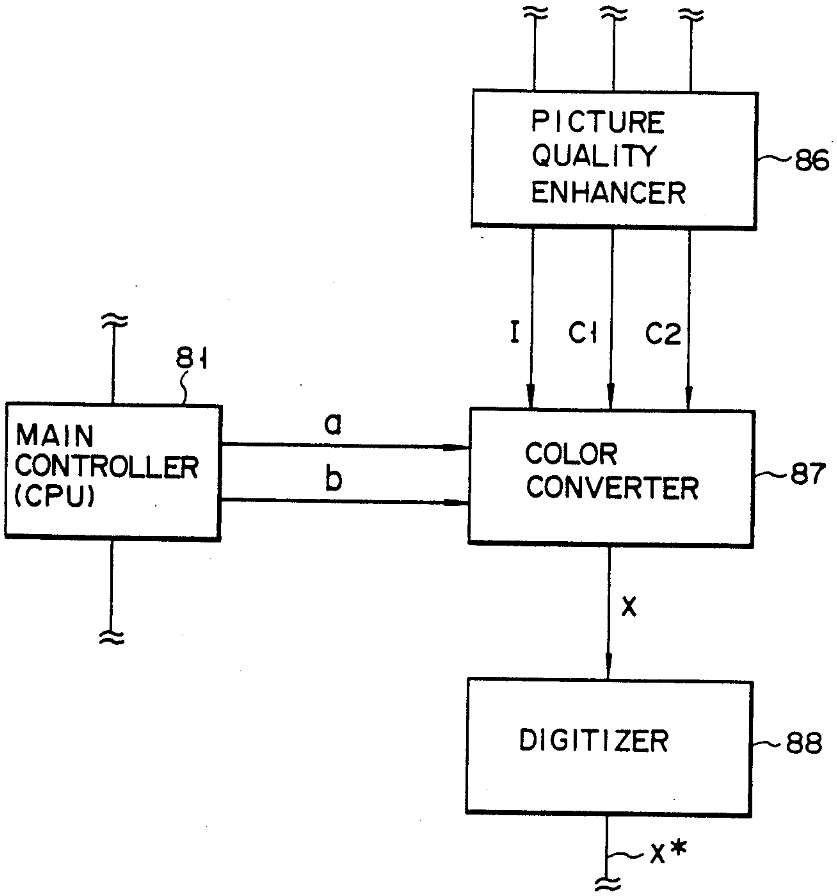
F I G. 15

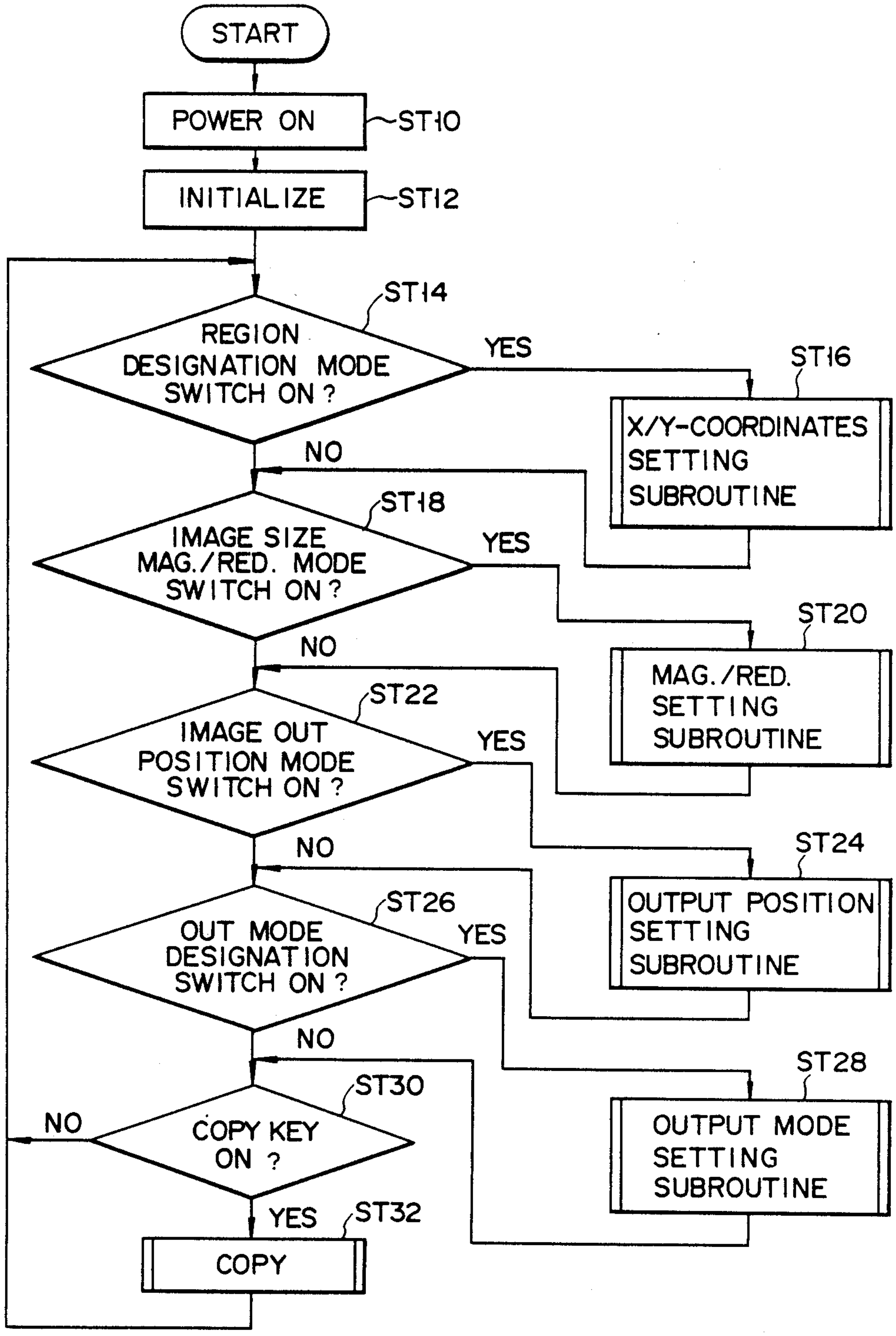
F I G. 18A

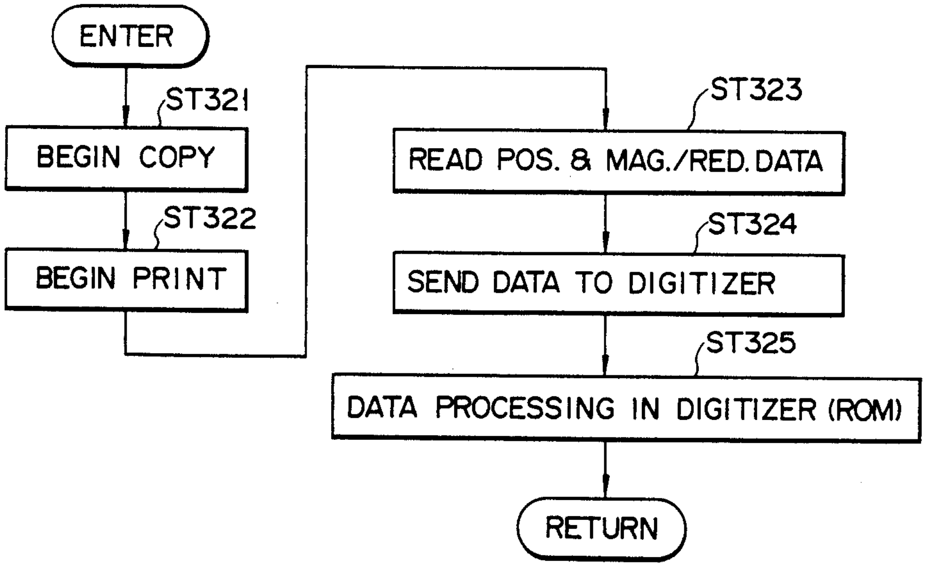
F I G. 18B
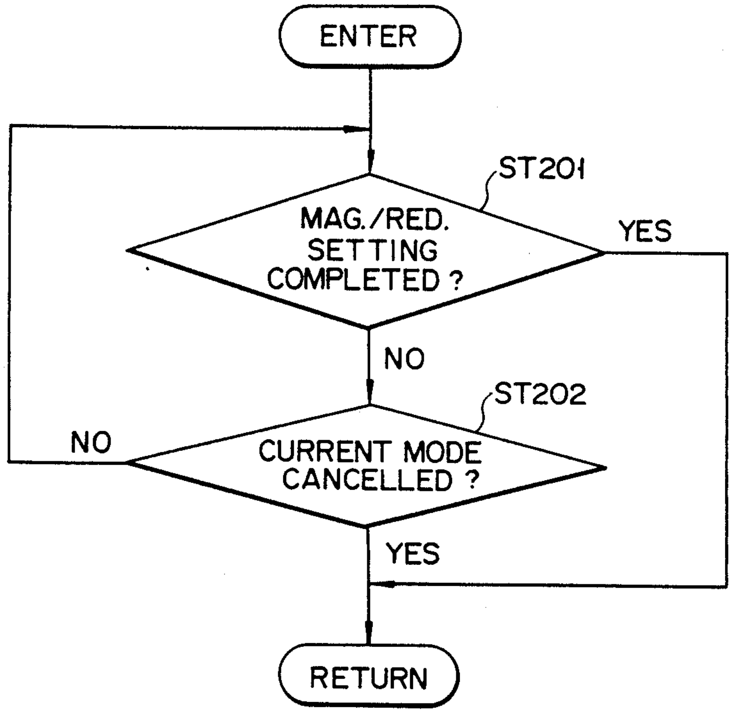
F I G. 18D

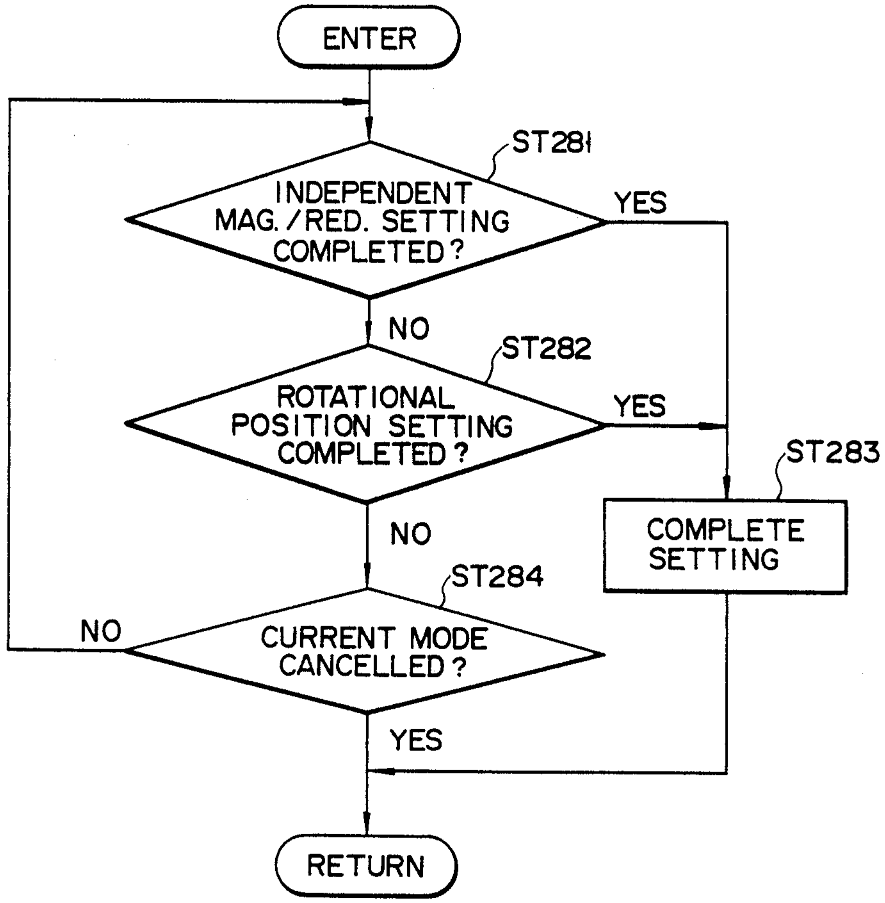
F I G. 18F

IMAGE PROCESSOR WITH PARTIAL IMAGE SIZE ZOOMING AND METHOD OF PARTIAL IMAGE PROCESSING

BACKGROUND OF THE INVENTION

1. Field of the Invention

The present invention relates to an improvement in an image processor for forming a manuscript image read from a manuscript on an image forming media.

2. Description of the Related Art

An image processor such as a color copying machine which utilizes digital techniques to form a full-color image by thermal transfer has a function of directly forming a manuscript image on paper (image forming media) or forming a magnified or reduced manuscript image.

It is sometimes required to magnify or reduce only a part of a manuscript image. In a conventional color copying machine, however, a part of a manuscript image cannot be extracted to be magnified or reduced while the other part of the manuscript image is directly formed.

SUMMARY OF THE INVENTION

It is an object of the present invention to provide an image processor capable of forming an image of an arbitrarily designated region of a manuscript in accordance with an arbitrarily set image formation magnification/reduction rate and reproducing an image other than the designated region in a one-to-one correspondence with the manuscript image.

An image processor according to the present invention comprises: a designating unit for designating a prescribed region of a manuscript; a setting unit for setting an image formation magnification/reduction rate (or image modification rate) for the prescribed region designated by the designating unit; a first image forming unit for forming a manuscript image at a portion corresponding to the prescribed region designated by the designating unit on an image forming media in accordance with the image formation magnification/reduction rate (modification rate) set by the setting unit; and a second image forming unit for forming a manuscript image at a portion corresponding to a region other than the prescribed region designated by the designating unit directly on the image forming media.

The image processor further comprises an instructing unit for instructing an image formation location, on the image forming media, of the manuscript image at the portion corresponding to the prescribed region designated by the designating unit.

With the above arrangement of the present invention, an image of a region arbitrarily designated from one manuscript can be formed in accordance with an arbitrarily set image formation magnification/reduction rate while an image of a region other than the designated region is reproduced in a one-to-one correspondence with the manuscript image.

In addition, an image of a region arbitrarily designated from one manuscript can be formed on a location arbitrarily set in an image forming media in accordance with an arbitrarily set image formation magnification/reduction rate.

BRIEF DESCRIPTION OF THE DRAWINGS

FIG. 6 is a perspective view of part of the copying machine shown in FIG. 4;

FIG. 14 is a schematic block diagram of an electronics part of the copying machine of FIG. 4;

FIG. 15 is a block diagram for explaining a color converter in the electronics part shown in FIG. 14;

FIG. 18A is a flow chart explaining an operation of the image processor of the invention;

FIG. 18B is a flow chart explaining the copy routine shown in FIG. 18A;

FIG. 18D is a flow chart explaining the magnification/reduction setting routine shown in FIG. 18A;

FIG. 18F is a flow chart explaining the output mode setting routine shown in FIG. 18A.

DETAILED DESCRIPTION OF THE PREFERRED EMBODIMENTS

Figure 1:
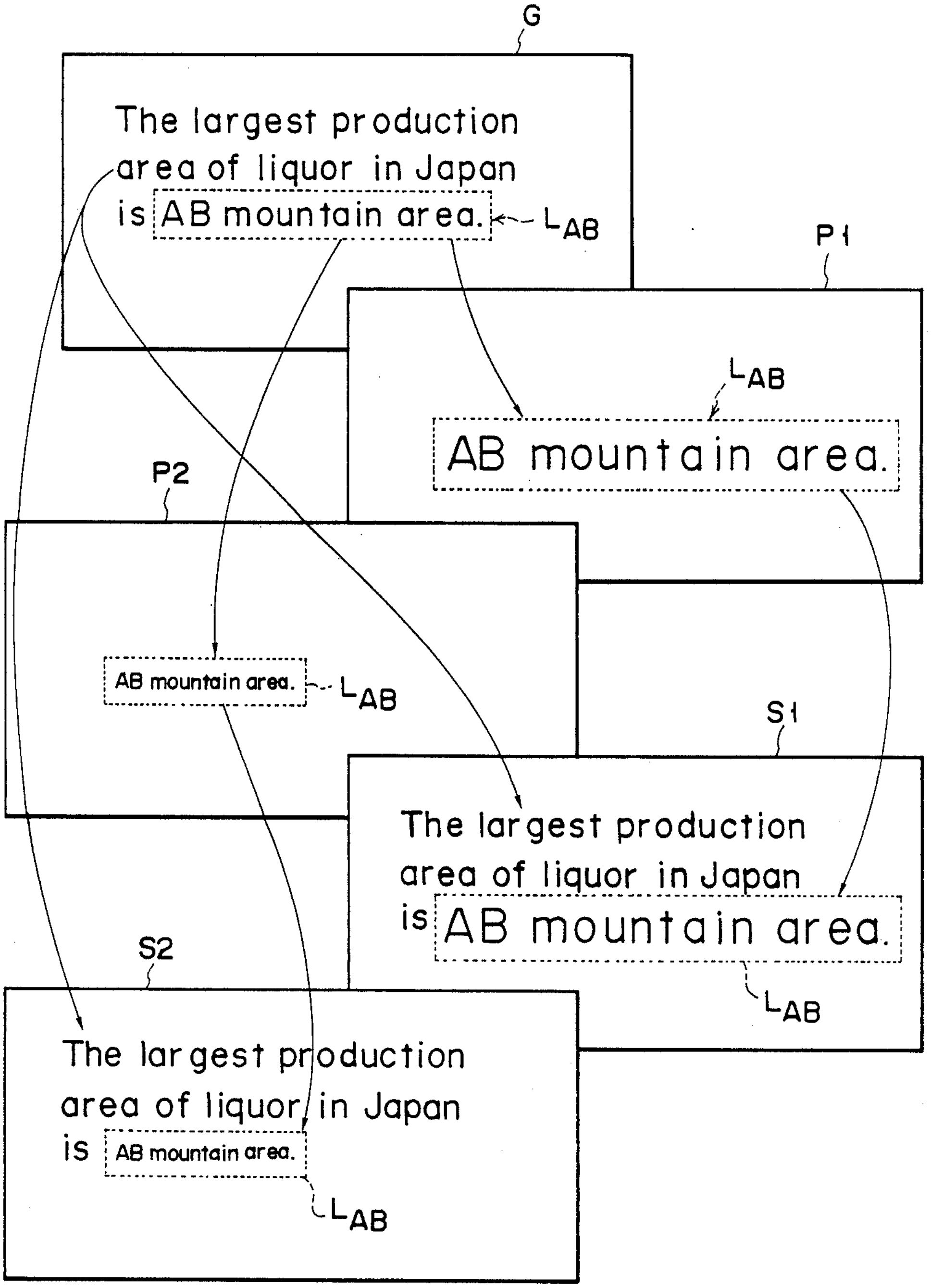
FIG. 1 illustrates how the magnified (P1) or reduced (P2) characters in an original manuscript (G) are combined with the remaining unchanged character string of the manuscript (S1 or S2)

Preferred embodiments of this invention will be described with reference to the accompanying drawings. In the description, the same or functionally equivalent elements are denoted by the same or similar reference numerals, to thereby simplify the description.

An embodiment of the present invention will be described below with reference to the accompanying drawings.

An image processor of the present invention can be applied to an ink-jet printer, a laser printer, a bubble-jet printer, a dot impact printer, a silver chloride photograph, a color thermal printer, and the like. This embodiment will be described by exemplifying a thermal transfer type color copying machine capable of forming a multicolor image. That is, in FIG. 4, reference numeral 1 denotes a copying machine main body. and an operation panel (to be described later with reference to FIG. 13) is provided on an upper front portion of main body 1. Manuscript scanning unit 3 for scanning and reading original manuscript G set on platen table (transparent glass) 2 is arranged in an upper portion of main body 1, and image forming unit 4 is arranged in its lower portion. Reference numeral 5 denotes a manuscript cover arranged to be freely opened/closed on table 2.

Figure 5:
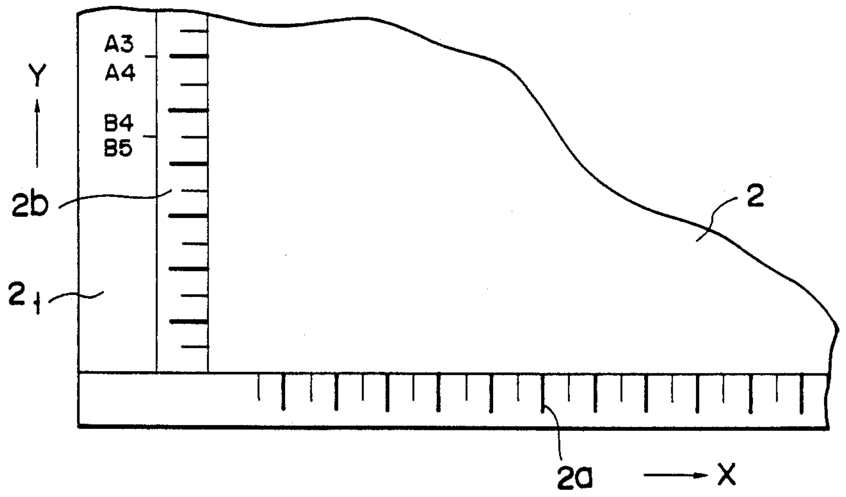
FIG. 5 partially shows a periphery of a platen table of the copying machine.

Table 2 is fixed to main body 1. As shown in FIG. 5, fixed scale $2_1$ as a set reference for a manuscript is located near table 2. In addition, X- and Y-direction scales *2a* and *2b* serving as references upon region designation are arranged in longitudinal and widthwise directions (X and Y directions) of table 2, respectively. Note that a method of designating a region will be described later.

Manuscript scanning unit 3 comprises: first carriage 7 having illumination lamp 6 as a light source; second carriage 8 for bending an optical path by a mirror; zoom lens 9; mirror unit 10 for compensating an optical path length upon magnification/reduction and guiding reflected light from manuscript G to light/electric converter 11; light/electric converter 11 for receiving reflected light from manuscript G; and a drive system (not shown) for changing the positions of these parts.

First carriage 7 mounts illumination lamp 6 for radiating light on manuscript G; reflector 12 as a reflecting mirror for collecting light from lamp 6 on a manuscript surface; and a mirror 13 for guiding reflected light from manuscript G toward second carriage 8.

Second carriage 8 mounts mirrors *8a* and *8b* for guiding light guided by mirror 13 toward zoom lens 9.

As shown in FIG. 6, first and second carriages 7 and 8 are connected by timing belt 18 so that second carriage 8 moves in the same direction as that of first carriage 7 at a ½ speed of carriage 7. Therefore, scanning can be performed while an optical path length to lens 9 is maintained constant. Lens 9 has a fixed focal length and is moved along an optical axis upon magnification/reduction.

Mirror unit 10 includes two mirrors *10a* and *10b*. In accordance with a change in optical path length corresponding to a selected magnification/reduction rate (copying magnification/reduction rate), positions of mirrors *10a* and *10b* are changed. Since mirrors *10a* and *10b* bend an optical path, light from lens 9 is guided to converter 11.

Converter 11 is mainly constituted by a CCD line image sensor (CCD sensor) and light/electric-converts reflected light from manuscript G, thereby separating and outputting an image of manuscript G as light color signals of cyan (C), green (G), and yellow (Y) or red (R), green (G), and blue (B). In this case, one pixel of manuscript G corresponds to three continuous elements (C, G, and Y) of the CCD sensor. An output from converter 11 is supplied to A/D converter (91) to be described later.

As shown in FIG. 6, first and second carriages 7 and 8 are moved in accordance with an operation of timing belt 19 looped between drive pulley 14 coupled to a rotating shaft of a stepping motor (not shown) and idle pulleys 15 and 16. Mirrors *10a* and *10b* and zoom lens 9 are moved by independent stepping motors (not shown). A spiral shaft (not shown) of lens 9 is rotated by a corresponding stepping motor, and lens 9 is moved along an optical axis by this movement of the shaft.

Figure 4:
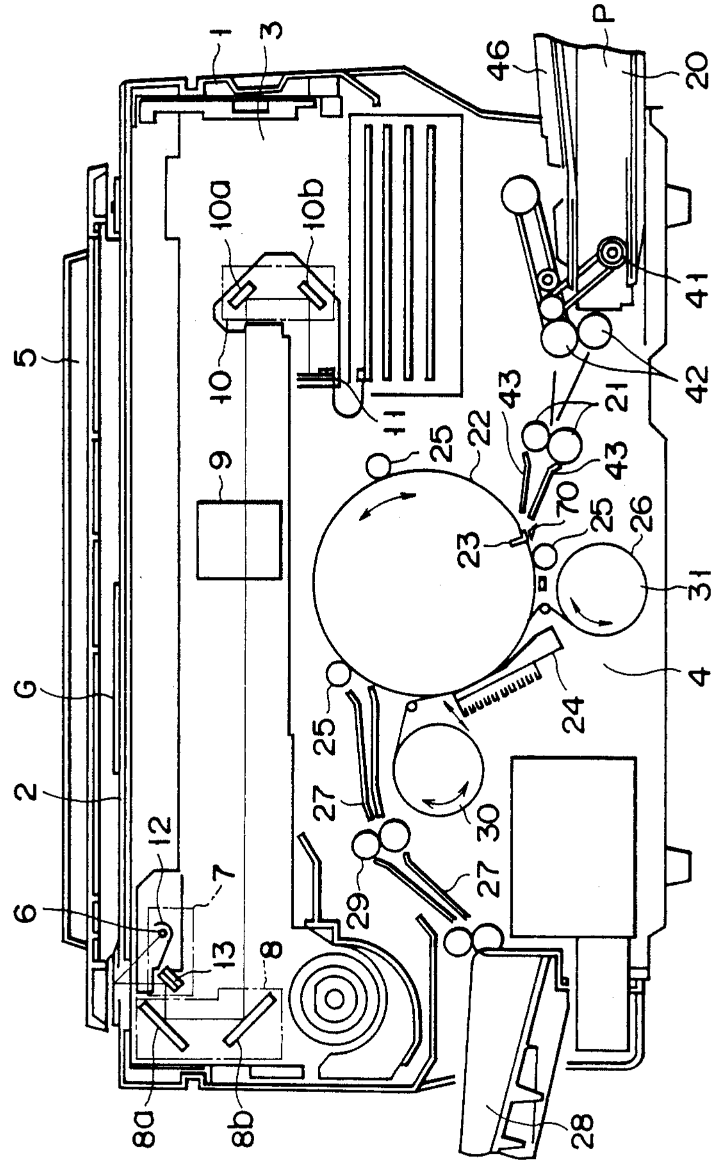
FIG. 4 is a schematic sectional view of a copying machine to which an image processor of the present invention can be applied.

A shown in FIG. 4, platen drum 22 is located at a substantially central portion of image forming unit 4. Drum 22 is covered with an elastic material such as rubber and functions as a platen roller of thermal head 24. Drum 22 rotates clockwise to wind a sheet of paper on its surface so that sheets are not offset upon overlap printing. Pressure rollers 25 are located around drum 22 with predetermined intervals therebetween so that a sheet does not float from drum 22. The circumference of drum 22 is slightly longer than a length in the longitudinal direction of a maximum paper size.

Thermal head 24 is located at a lower left position of drum 22. Head 24 is mounted on a heat radiator formed integrally with a rear end face of a holder. Ink ribbon 26 for forming an image is interposed between drum 22 and head 24.

In ink ribbon 26, inks of three colors, yellow (Y), magenta (M), and cyan (C) or four colors, yellow, magenta, cyan, and black ($B_L$) are sequentially arranged in the longitudinal direction of a film base. Cores 30 and 31 on which ribbon 26 is wound are connected to a drive shaft of a motor (not shown) via a driving force transmission mechanism and can be rotated if necessary.

Paper feed roller 41 is located in a lower portion of main body 1 and picks up sheets of paper P as image forming media stored in paper feed cassette 20 one after another. Cassette 20 is freely detached from the side surface of main body 1. Paper P picked up by roller 41 is fed by feed roller 42 to resist roller 21 located at an upper left position of roller 42. Thereafter, paper P is fed by resist roller 21 to drum 22 via guides 43, wound around drum 22 by gripper 23 and urging rollers (pressure rollers) 25, and accurately fed in this state. Paper P supplied from manual paper feed unit 46 is similarly wound around drum 22.

As shown in FIGS. 7 to 10, gripper 23 is substantially L-shaped and mounted on drum 22 so as to be movable in a direction indicated by an arrow by spring *23a* provided at its one end. Gripper 23 is longer than a drum width of drum 22 and has pawls *23b* at its both ends.

Gripper releasing pawl 70 is provided on frame *1a* of main body 1 in correspondence with a feeding unit for feeding paper P to drum 22. Pawl 70 is provided to be movable by spring *70a* so as to be disengaged from gripper 23 upon clockwise rotation of drum 22 and engaged with gripper 23 upon counterclockwise rotation of drum 22.

Figure 9:
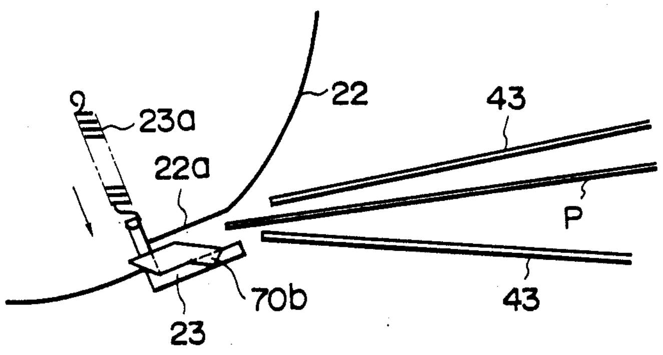
FIG. 9 is a front view illustrating a mechanical relation between the gripper and a copy paper.

When drum 22 is rotated counterclockwise to cause gripper 23 to correspond to pawl 70, metal piece *70b* and pawl *23b* of gripper 23 are engaged with each other. As a result, as shown in FIG. 9, gripper 23 is extracted in a direction indicated by an arrow. In this state, paper P fed along guides 43 is inserted between drum 22 and gripper 23. When drum 22 is further rotated, metal piece *70b* of pawl 70 is disengaged from pawl *23b*, and paper P is held by drum 22 and gripper 23. Thereafter, drum 22 is rotated clockwise to feed paper to thermal head 24.

Figure 10:
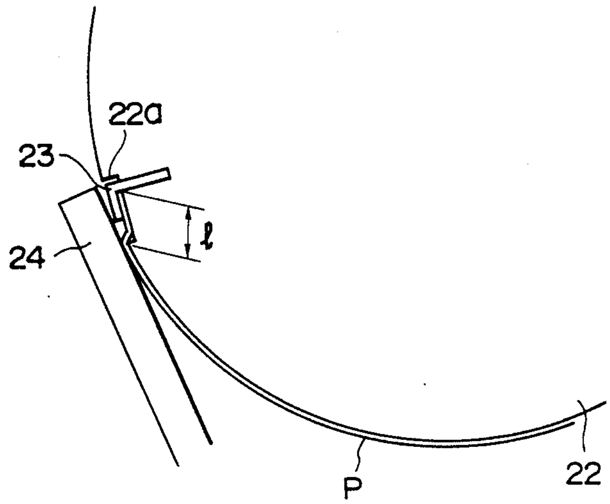
FIG. 10 is a side view illustrating a mechanical relation between the gripper and the copy paper.

Paper P whose leading end is fixed by gripper 23 is wound around drum 22 upon clockwise rotation. After the leading end passes through a printing area, head 24 is pressurized on drum 22 to perform printing. In this case, as shown in FIG. 10, gripper 23 is housed in recess portion 22*a* of drum 22, i.e., located inside the circumference of drum 22. Therefore, non-image portion l at the leading end of paper l can be minimized. That is, if gripper 23 projects outside the circumference of drum 22, head 24 cannot be pressed against drum 22 until gripper 23 is moved sufficiently away from the printing area. As a result, non-image portion l at the leading end of paper P is increased.

In this embodiment, gripper 23 is elongated along a cylinder (in a widthwise direction) of drum 22. Therefore, since paper P can be aligned by using gripper 23, resist roller 21 need not be used.

When printing of a first color is completed for paper P fed to the printing area as described above, drum 22 is rotated substantially once. Therefore, head 24 is temporarily released, and ribbon 26 is wound to detect a start position of the next color. Drum 22 is then rotated clockwise again, and printing is performed by head 24, thereby printing the next color on the first color.

In this manner, in full-color copying, a multicolor image is formed by performing the operations four times in correspondence with yellow, magenta, cyan, and black or three times in correspondence with yellow, magenta, and cyan. Note that a single-color image is formed by performing the operation once.

Figure 11:
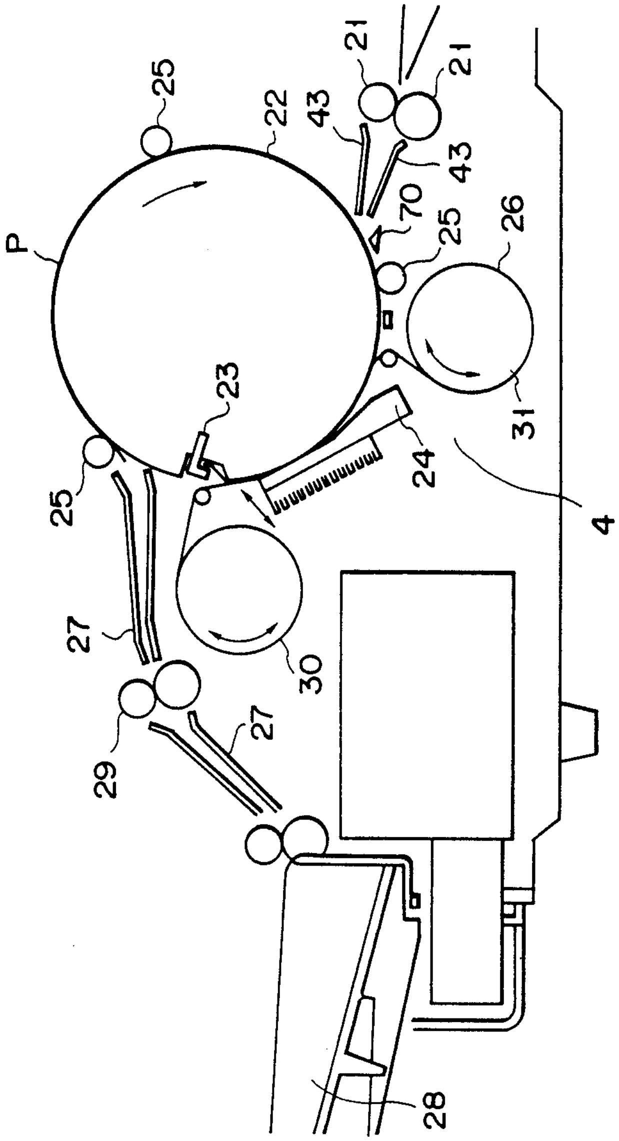
FIG. 11 shows a paper feeding state in which a platen drum rotates in a clockwise direction.
Figure 12:
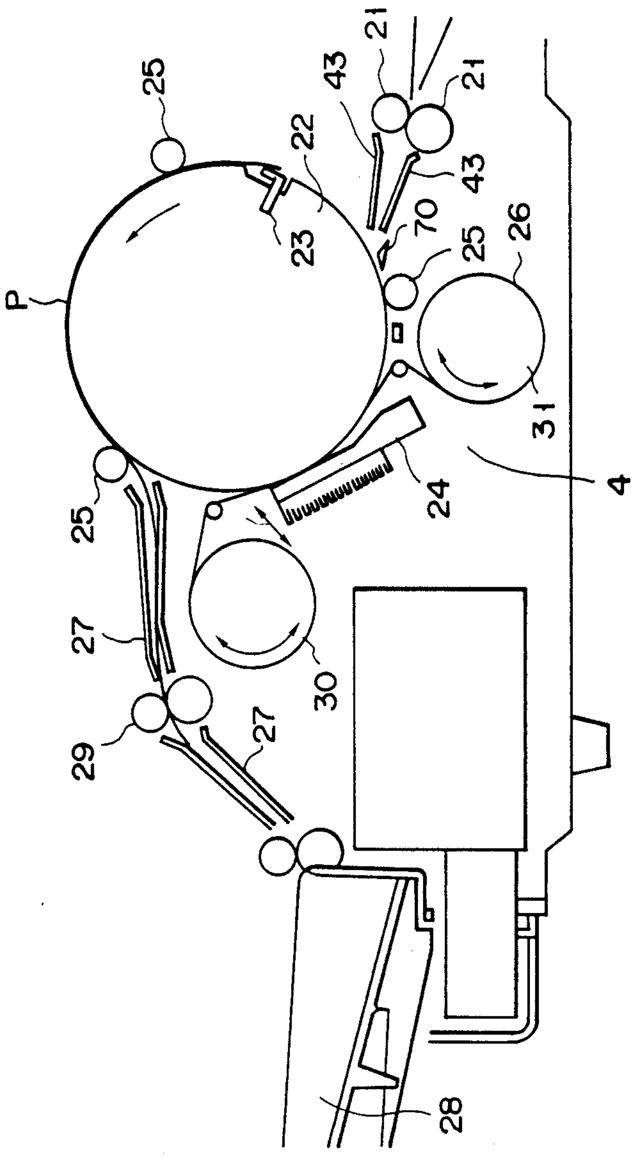
FIG. 12 shows a paper feeding state in which the platen drum rotates in a counterclockwise direction.

In order to discharge the paper, as shown in FIG. 11, drum 22 is rotated clockwise until a trailing end of paper P reaches paper discharge guide 27. When the trailing end of paper P reaches guide 27, as shown in FIG. 12, drum 22 is rotated counterclockwise. As a result, the trailing end of paper P is separated from drum 22 by a separating pawl (not shown) and guided to guide 27. In addition, when gripper 23 passes through the feeding unit, the leading end of paper P is released from gripper 23 by, e.g., gripper releasing pawl 70. After the leading end is released from gripper 23, paper P is fed by guide 27 to re-melting roller pair 29 rotated in synchronism with rotation of drum 22. When paper P passes through roller pair 29, the re-melting/penetration of inks on paper P is performed. Thereafter, paper P is discharged on paper discharge tray 28.

Figure 13:
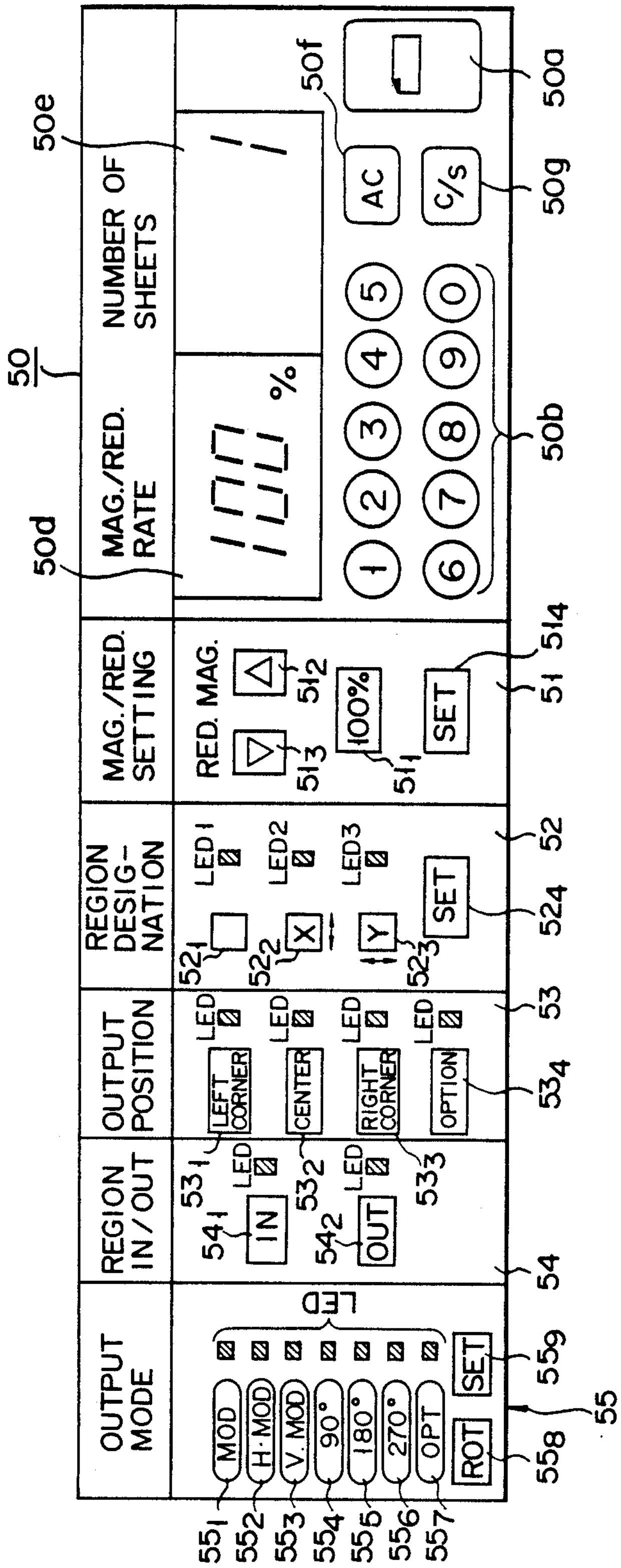
FIG. 13 shows an operation panel of the copying machine provided with an image processor of the present invention.

FIG. 13 shows an operation panel provided on main body 1. Operation panel 50 includes: copy key 50*a* for instructing start of copying; ten keys 50*b* for setting the number of sheets to be copied and the like; magnification/reduction setting section 51 for setting a rate of magnification or reduction (image formation magnification/reduction rate) of copying; magnification/reduction rate display 50*d* for displaying a copying magnification/reduction rate set by setting section 51; number-of-sheets display 50*d* for displaying the number of sheets to be copied set by ten keys 50*b*; all clear (AC key 50*f* for clearing all of set copying conditions; clear/stop key (C/S) key 50*g* for cancelling the number of sheets to be copied or a copying operation; region designation section 52 for designating a region on a manuscript to be magnified/reduced; output position designation section 53 for designating an out put position (image formation position on paper) of an image corresponding to the region designated by region designation section 52; and region in/out designation section 54 for designating whether an image corresponding to a portion inside or outside the region designated by region designation portion 52 is to be magnified/reduced.

Magnification/reduction setting section 51 has: equal magnification key $51_1$ for setting a copying magnification/reduction rate to an equal magnification (100%); magnification key $51_2$ and reduction key $51_3$ capable of changing magnification and reduction rates, respectively, in units of 1%; and magnification/reduction set key $51_4$ for storing a set magnification/reduction rate in memory 97 (to be described later).

When key $51_4$ is operated, the magnification/reduction rate set by section 51 corresponds to a magnification/reduction rate used upon formation of an image corresponding to a prescribed region designated by region designation section 52 and region in/out designation section 54. That is, by operating key $51_4$, a magnification/reduction rate for an image corresponding to or designated region can be arbitrarily set.

Region designation section 52 has: region designation key $52_1$ operated first in region designation; X-coordinate input key $52_2$ operated when an X-coordinate of a designated area is to be input by ten keys 50*b* in accordance with X-direction scale 2*a*; Y-coordinate input key $52_3$ operated when a Y-coordinate of a designated region is to be input by ten keys 50*b* in accordance with Y-direction scale 2*b*; and region set key $52_4$ for storing X- and Y-coordinates input in accordance with operations of X- and Y-coordinate input keys $52_2$ and $52_3$, respectively.

In order to designate a region, X-coordinate input key $52_2$, ten keys 50*b*, region set key $52_4$, Y-coordinate input key $52_3$, ten keys 50*b*, and region set key $52_4$ are operated in this order, and this operation is repeated twice. As a result, a rectangular region represented by coordinates (position information on a manuscript) of two points at diagonal corners can be arbitrarily designated.

Output position designation section 53 has: left corner designation key $53_1$ operated when an image corresponding to a portion inside a region designated by region designation section 52 and region in/out designation section 54 is to be moved to the left and formed at a left corner of paper; center designation key $53_2$ operated when an image corresponding to a portion inside a designated region is to be moved to the right or left and formed at the center of paper; right corner designation key $53_3$ operated when an image corresponding to portion inside a designated region is moved to the right and formed at a right corner of paper; and output position designation key $53_4$ operated when an image corresponding to a portion inside a designated region is moved to an arbitrary position and formed at an arbitrary position of the paper.

That is, by operating output position designation section 53, an image corresponding to a portion inside a designated region can be moved to and formed at an arbitrary position of paper.

Note that in order to designate an output position of an image by using output position designation key $53_4$, coordinates (position information on a manuscript with respect to the paper) are inputted by keys $52_1$ to $52_4$ of region designation section 52 and ten keys 50*b* in accordance with X- and Y-direction scales 2*a* and 2*b*.

Region in/out designation section 54 has: region in designation key $54_1$ operated when a portion inside a region designated by region designation section 52 is to be formed in accordance with a magnification/reduction rate set by magnification/reduction setting section 51; and region-out designation key $54_2$ operated when a portion outside a region designated by region designation section 52 in accordance with a magnification/reduction rate is set by magnification/reduction rate setting section 51.

That is, when region-in designation key $54_1$ is operated, an image corresponding to a portion inside a designated region is formed in accordance with a magnification/reduction rate set by magnification/reduction rate setting section 51, and an image corresponding to a portion outside the designated region is formed at an equal magnification (one-to-one correspondence with a manuscript image).

When region-out designation key $54_2$ is operated, an image corresponding to a portion outside a designated region is formed in accordance with a magnification/reduction rate set by magnification/reduction setting section 51, and an image corresponding to a portion inside the designated region is formed at an equal magnification (one-to-one correspondence with a manuscript image).

FIG. 14 schematically shows an overall control system comprising main controller 81, first subcontroller 82, and second subcontroller 83. Main controller 81 includes a CPU, connected to operation panel 50, memory 97, compensation circuit 84, luminance/color difference separator 85, picture quality enhancer 86, color converter 87, digitizer circuit 88, and first and second subcontrollers 82 and 83, and controls these circuits.

First subcontroller 82 includes a sub CPU, connected to light source controller 89, motor driver 90, light/electric converter 11, A/D converter 91, and resolution converter 92, and controls these circuits. Light source controller 89 is connected to illumination lamp 6 and controls ON/OFF and a light amount of lamp 6. That is, controller 89 turns on lamp 6 in a normal image read operation. Motor driver 90 drives scanning motor (stepping motor) 80 for moving first and second carriages 7 and 8.

Second subcontroller 83 includes a sub CPU, connected to thermal head temperature controller 93, thermal head 24, detection switches 94, and driver 95, and controls these circuits. Driver 95 is connected to and drives drive system 96 consisting of a motor and a solenoid for driving zoom lens 9, mirror unit 10, and platen drum 22.

Compensation circuit 94 performs standardization (shading compensation, i.e., variation compensation of light/electric converter 11) on the basis of multigradation image data (after resolution conversion) obtained by A/D-converting reflected light from manuscript G (FIG. 4) and reference data.

Memory 97 mainly stores inputs from operation panel 50, e.g., stores various data for copying an image corresponding to a prescribed region of manuscript G by changing a magnification/reduction rate. That is, memory 97 stores a magnification or reduction rate set by magnification or reduction key $51_2$ or $51_3$ in accordance with an operation of magnification/reduction set key $51_4$ of magnification/reduction setting section 51, a prescribed region (position information on a manuscript) represented by coordinates of two points designated by ten keys 50*b* in accordance with an operation of region set key $52_4$ of region designation section 52, and the like.

Color converter 87 will be described in detail below with reference to FIG. 15 Converter 87 reproduces yellow (Y), magenta (M), cyan (C), and black ($B_L$) from luminance signal (I), color difference signal 1 (C1), and color difference signal 2 (C2). (This operation for reproducing Y, M, and C from signals I, C1, and C2 is similar to an operation of a color matrix for reproducing three primary color signals R, G, and B from luminance signal Y, color difference signal R-Y, and color difference signal B-Y in an NTSC color TV system.) $B_L$ is obtained by synthesizing Y, M, and C. Reproduced color signals Y, M, C, and $B_L$ are sequentially selected and supplied as multi-gradation digital color signal x to digitizer 88. Selection of color signals Y, M, C, and $B_L$ is performed by main controller 81.

That is, as shown in TABLE 1 below, color signal Y, M, C, or $B_L$ to be supplied to digitizer 88 is selected on the basis of a combination of 2-bit signals a and b supplied from main controller 81 to color converter 87. Note that color signals Y, M, C, and $B_L$ are automatically sequentially selected (e.g., in an order of Y→M→C→$B_L$).

TABLE 1

| a | b | x |
|---|---|---|
| 0 | 0 | Y |
| 0 | 1 | M |
| 1 | 0 | C |
| i | 1 | $B_L$ |

Digitizer 88 has a memory (VRAM 881 shown in FIG. 17A) for storing color signals supplied from color converter 87 in units of colors together with position information on a manuscript. In accordance with an instruction from main controller 81, digitizer 88 selectively outputs color signal (Y, M, C, or $B_L$) of each position information stored in the memory.

A normal copying operation performed in the above arrangement will be described below. Assume that an operator designates copying conditions such as a magnification/reduction rate by operation panel 50 (FIG. 13), a manuscript is placed on platen table 2 (FIG. 4), and copy key 50*a* on panel 50 is operated. In this case, main controller 81 (FIG. 14) controls drive system 96 via second subcontroller 83 and driver 95, thereby moving the position of zoom lens 9 (FIG. 4) in accordance with the designated copying magnification/reduction rate. In addition, first subcontroller 82 and light source controller 89 are controlled by main controller 81 to turn on illumination lamp 6. At the same time, scanning motor 82 is driven via first subcontroller 82 and motor driver 90, thereby moving first and second carriages 7 and 8 (FIG. 6). As a result, light from lamp 6 is radiated on the manuscript through table 2.

Light reflected by manuscript G is guided to light/electric converter 11 via mirrors 13, 8*a*, and 8*b*, zoom lens 9, and mirrors 10*a* and 10*b* in this order. The reflected light is split into analog color signals of cyan (C), green (G), and yellow (Y) by converter 11 and supplied to A/D converter 91. Converter 91 converts each analog color signal into a multi-gradation digital signal (having 16 gradations in the case of 4-bit A/D conversion). A signal corresponding to manuscript G is output from A/D converter 91 to resolution converter 92.

Converter 92 performs resolution conversion so that the resolution (e.g., 400 dots per inch) of light-electric converter 11 coincides with the resolution (e.g., 200 dots per inch) of thermal head 24, and sends the conversion result to compensation circuit 84. Circuit 84 performs compensation processing (shading compensation) so that color signals C, G, and Y supplied from resolution converter 92 are standardized on the basis of the reference data and a variation in converter 11 is compensated and sends the compensation result to luminance/color difference separator 85.

Separator 85 performs various operations for each of color signals C, G, and Y supplied from compensation circuit 84 to separate the signal into luminance signal (I), color difference signal 1 (C1), and color difference signal 2 (C2), and sends the signals to picture quality enhancer 86. (A luminance/color difference separating operation from C, G, and Y to I, C1, and C2 in separator 85 can be performed similar to a luminance/color difference separating operation from R, G, and B to Y, R-Y, and B-Y in an NTSC color TV system.)

Enhancer 86 analyzes an amplitude and a frequency component of each of luminance signal I and color difference signals 1 C1 and 2 C2 supplied from separator 85, performs picture quality enhancing processing, such an edge emphasis, and sends processed signals to color converter 87.

Converter 87 performs color conversion on the basis of luminance signal I and color difference signals 1 C1 and 2 C2 subjected to the image quality enhancing processing, converts the signals into a color signal (corresponding to a color density) of one of yellow (Y), magenta (M), cyan (C), and black ($B_L$) [three primary colors (Y, M, and C) in printing plus $B_L$], and sends the color signal to digitizer 88.

Digitizer 88 performs area/gradation conversion based on a dither method for the color signal (of one of Y, M, C, and $B_L$) having a gray scale supplied from converter 87, i.e., digitizes the color signal. A digital signal from which the gray scale is removed by this conversion is sent to thermal head temperature controller 93.

Controller 93 sends a print signal to thermal 24 on the basis of the binary signal supplied from digitizer 88.

In response to an operation of copy key 50*a*, main controller 81 controls drive system 96 via second subcontroller 83 and driver 95, thereby driving paper feed roller 41, feed roller 42, resist roller 21, and platen drum 22. As a result, paper P in paper feed cassette 20 is picked up by paper feed roller 41 and fed by rollers 42 and 21. Paper P fed by roller 21 is guided to drum 22 along guides 43 and wound around drum 22 when its leading end is held by gripper 23.

In this state, when paper P is moved to the printing position of head 24 upon rotation of drum 22, head 24 melts, in accordance with the color signal, color inks of ink ribbon 26 corresponding to the print signals, thereby performing printing (i.e., image formation) on paper P wound around drum 22.

When multi- or single-color printing based on overlap transfer is completed as described above, main controller 81 controls first subcontroller 82 and light source controller 89, thereby turning off lamp 6. In addition, drive system 96 is controlled via second subcontroller 83 and driver 95 to discharge paper P wound around drum 22 to paper discharge tray 28, thereby completing the copying operation.

An operation in which only a part of a manuscript image is copied by changing a magnification/reduction rate (while the other portion is copied in a one-to-one correspondence with the manuscript image) will be described below with reference to FIG. 16.

In order to copy a manuscript image by changing a magnification/reduction rate for only a part thereof, a designation operation for designating a region to be magnified or reduced is performed. In this case, as shown in FIG. 16, manuscript G is set on platen table 2 with reference to a lower left corner of table 2 such that a surface to be copied on which image information is formed faces up. When region designation key $52_1$ of region designation section 52 on operation panel 50 is operated, an LED indicator corresponding to key $52_1$ is turned on. Subsequently, X-coordinate input key $52_2$ is operated (and a corresponding LED indicator is turned on), and X-coordinate $X_A$ of point A of two points at the ends of a diagonal of a region to be designated is inputted by operating ten key 50*b* in accordance with X-direction scale 2*a*. In this state, by operating region set key $52_4$, X-coordinate $X_A$ of point A is stored in memory 97 connected to main controller 81.

Subsequently, Y-coordinate input key $52_3$ is operated (and a corresponding LED indicator is turned on), and Y-coordinate $Y_A$ of point A is inputted by operating ten keys 50*b* in accordance with Y-direction scale 2*b*. In this state, by operating region set key $52_4$, Y-coordinate $Y_A$ of point A is stored in memory 97 connected to main controller 81.

When input of the coordinates (position information) of point A, i.e., one of the two points at the ends of the diagonal of the region to be designated is completed in this manner, input of coordinates of point B, i.e., the other one of the two diagonal points is similarly performed. That is, when X-coordinate input key $52_2$ is operated (and a corresponding LED indicator is turned on), X-coordinate Xn of point B input by ten keys 50*b* in accordance with X-direction scale 2*a* is stored in memory 97 connected to main controller 81 by operating region set key $52_4$. Subsequently, when Y-coordinate input key $52_3$ is operated (and a corresponding LED indicator is turned on), Y-coordinate $Y_B$ of point B input by ten keys 50*b* in accordance with Y-direction scale 2*b* is stored in memory 97 by operating region set key $52_4$.

Figure 16:
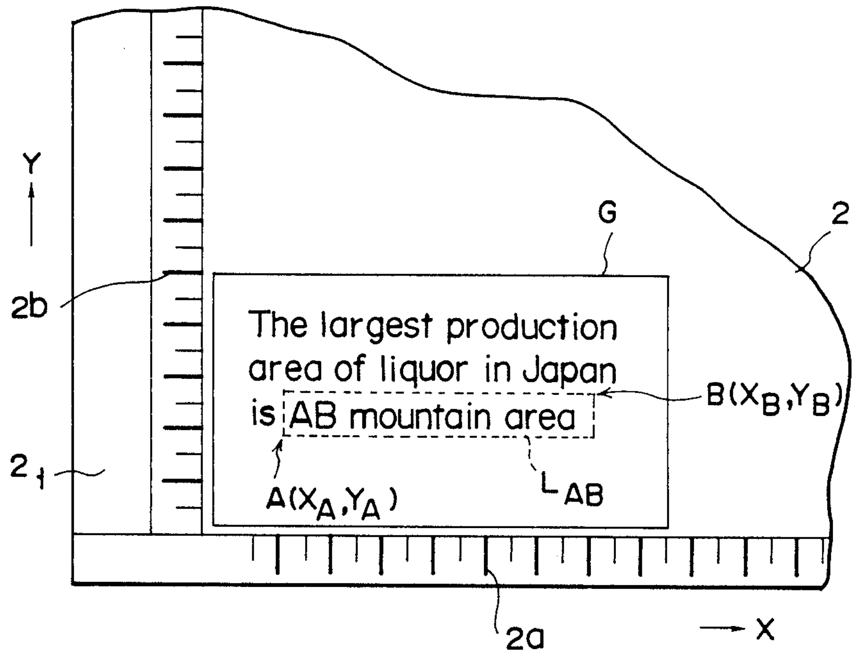
FIG. 16 is an illustration for explaining a region designation for a manuscript.
Figure 7:
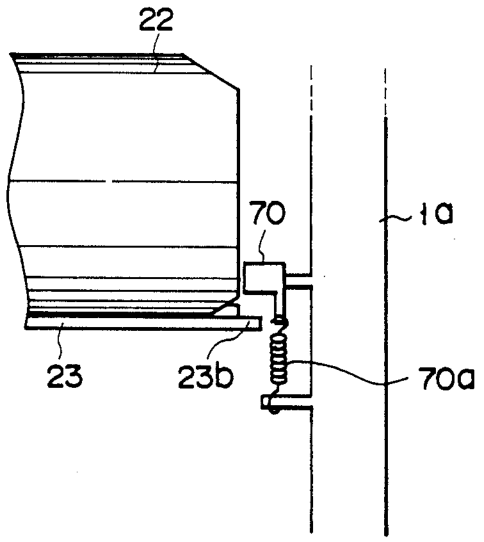
FIG. 7 is a front view illustrating a mechanical relation between a gripper and a hook for releasing the gripper.
Figure 8:
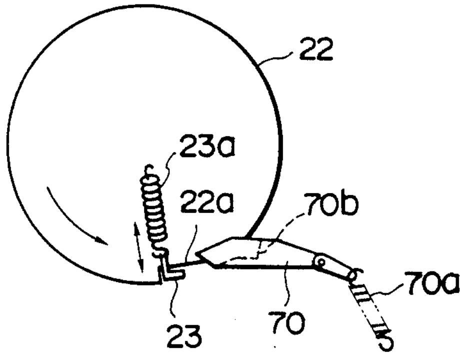
FIG. 8 is a side view illustrating a mechanical relation between the gripper and the hook for releasing the gripper.

With the above operation, an arbitrary rectangular region having two points A and B as end points of a diagonal, e.g., a region inside (or outside) a portion indicated by broken line $L_{AB}$ in FIG. 16 is designated as a region of a manuscript image to be copied by changing a magnification/reduction rate. Note that in order to perform copying, manuscript G is turned over in the X direction along fixed scale $2_1$. Therefore, position information in the X direction obtained upon region designation is changed (reversed) when copying is performed, while position information in the Y direction remains unchanged.

When region designation is completed as described above, an operation for designating whether a magnification/reduction rate for an image corresponding to a portion inside the designated area is to be changed or that of an image corresponding to a portion outside the region is performed by region in/out designation section 54. That is, when region-in designation key $54_1$ of section 54 is operated, a corresponding LED indicator is turned on, and designation representing that a magnification/reduction rate of an image corresponding to a portion inside the designated region is to be changed is performed. When region-out designation key $54_2$ of section 54 is operated, a corresponding LED indicator is turned on, and designation representing that a magnification/reduction rate of an image corresponding to a portion outside the designated region is to be changed is performed.

Subsequently, a setting operation for setting the magnification/reduction rate of the region to be magnified/reduced is performed. In this case, magnification key $51_2$ or reduction key $51_3$ is operated to set an arbitrary magnification or reduction rate. By operating magnification/reduction rate set key $51_4$, the set magnification/reduction rate is stored in memory 97 connected to main controller 81.

When a magnification/reduction rate of an image corresponding to a portion inside the designated region is to be changed, a designation operation for designating an output position of the image on paper P is performed.

That is, in order to output the image at the left corner of paper P, left corner designation key $53_1$ of output position designation section 53 is operated, and a corresponding LED indicator is turned on. Similarly, in order to output the image at the center or right corner of paper P, center designation key $53_2$ or right corner designation key $53_3$ is operated (and a corresponding LED indicator is turned on). When output position designation key $53_4$ is operated, the image can be output to an arbitrary position on paper P. In this case, key $53_4$ is operated (and corresponding LED indicator is turned on), and coordinates (e.g., a reference point) of an output position are inputted by region designation section 52 and ten keys 50*b*. As a result, an arbitrary point on paper P can be designated as an output position.

Although not shown, by repeatedly performing the above operation, a region as indicated by broken line $L_{AB}$ in FIG. 16 can be designated at a plurality of portions for the same printout results. In addition, an image formation magnification/reduction rate and a printout position corresponding to a portion inside each of the designated regions can be set and designated for each region.

An operation for copying a manuscript image by changing a magnification/reduction rate for only a part of the image (while the other part is copied in a one-to-one correspondence with the manuscript image) will be described below.

Assume that an operator performs a designation of a region, setting an image formation magnification/reduction rate corresponding to the designated region, designation of an output position of an image corresponding to the designated region, and the like by using operation panel 50 as described above. Manuscript G on table 2 is turned over and placed on table 2 with the surface to be copied facing down, and copy key 50*a* on panel 50 is turned on.

Main controller 81 controls drive system 96 via second subcontroller 83 and driver 95, thereby moving the position of zoom lens 9 in correspondence with the copy magnification/reduction rate (set magnification/reduction rate). Controller 81 also controls first subcontroller 82 and light source controller 89 to turn on illumination lamp 6, and drives scanning motor 80 via controller 82 and motor driver 90, thereby moving first and second carriages 7 and 8. As a result, light from lamp 6 is radiated on manuscript G through table 2.

Light reflected by manuscript G is guided to light-electric converter 11 via mirrors 13, 8*a*, and 8*b*, zoom lens 9, and mirrors 10*a* and 10*b* in the order named. The reflected light is then converted into a color signal corresponding to an image of manuscript G via A/D converter 91, resolution converter 92, compensation circuit 84, luminance/color difference separator 85, picture quality enhancer 86, and color converter 87, and supplied to digitizer 88. The color signal is digitized by digitizer 88 and supplied to thermal head temperature controller 93.

Main controller 81 controls the binary signal output supplied from digitizer 88 to controller 93 on the basis of actual position information obtained from position information stored in memory 97.

That is, in order to copy the manuscript image by changing a magnification/reduction rate for only a part of the image, an image is obtained as shown in FIG. 1. First, an output signal from digitizer 88 is so controlled as to form only an image of a portion corresponding to a region (indicated by broken line $L_{AB}$ in FIG. 1) of manuscript G designated by panel 50 at a designated prescribed position of paper P1 (P2) in accordance with a set magnification/reduction rate. As a result, thermal head temperature controller 93 sends a print signal based on the binary signal supplied from digitizer 88 to thermal head 24. As a result, as shown in FIG. 1, only a part "AB mountain area." corresponding to the designated region of the manuscript image is copied in accordance with the set magnification/reduction rate at the designated position of paper P1 (or P2) picked up from cassette 20 and wound around drum 22.

In this manner, only the image of a portion corresponding to the designated area is formed at the designated position of paper P1 (or P2) in accordance with the set magnification/reduction rate. Thereafter, main controller 81 controls drive system 96 via second subcontroller 83 and driver 95 to move the position of lens 9 in accordance with a copy magnification/reduction rate (equal magnification). Main controller 81 also controls first subcontroller 82 and light source controller 89 to turn on lamp 6, and drives motor 80 via subcontroller 82 and motor driver 90, thereby moving first and second carriages 7 and 8. As a result, light from lamp 6 is radiated on manuscript G through table 2.

Light reflected by manuscript G is guided to light/electric converter 11 via mirrors 13, 8*a*, and 8*b*, lens 9, and mirrors 10*a* and 10*b* in this order, converted into a color signal corresponding to the image of manuscript G via A/D converter 91, resolution converter 92, compensation circuit 84, luminance/color difference separator 85, picture quality enhancer 86, and color converter 87, and supplied to digitizer 88. The color signal is digitized by digitizer 88 and supplied to thermal head temperature controller 93.

Main controller 81 controls the binary signal output from digitizer 88 to controller 93 on the basis of actual position information obtained from position information stored in memory 97. In this case, the binary signal output is so controlled as to form an image of a portion other than the portion corresponding to region $L_{AB}$ designated by panel 50 on paper P1 (or P2) on which the image of a portion corresponding to the designated region is formed.

That is, masking is performed (i.e., the binary signal output corresponding to the position information of the portion of paper P1 (or P2) on which the image is formed) for the portion (indicated by broken line $L_{AB}$ in FIG. 1) of paper P1 (or P2) on the basis of the position information stored in memory 97, so that the image is not overlapped.

As a result, controller 93 supplies a print signal based on the binary signal supplied from digitizer 88 to thermal head 24. Therefore, the image of the portion other than the portion corresponding to designated region $L_{AB}$ of the manuscript image is copied in a one-to-one correspondence with manuscript G on paper S1 (or S2) on which the image "AB mountain area" of the portion corresponding to designated region $L_{AB}$ is formed.

Figure 2:
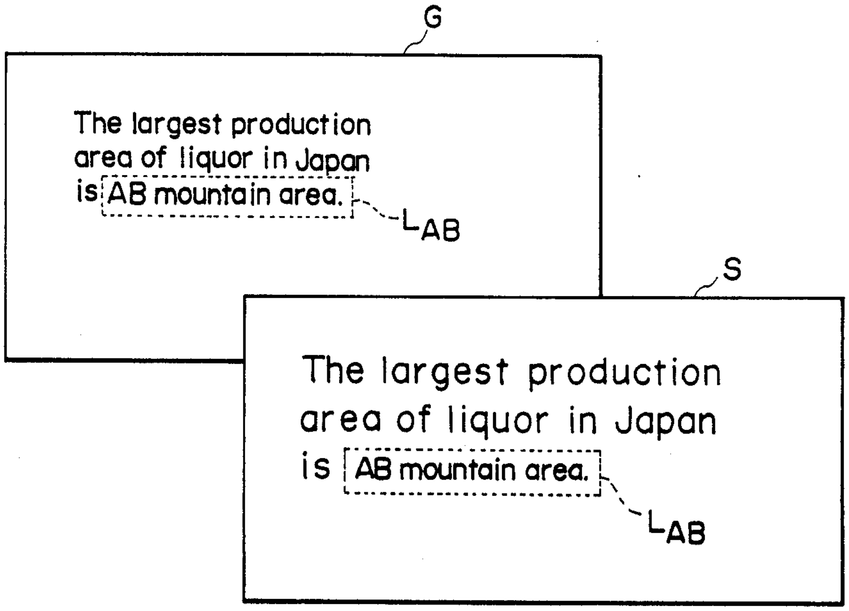
FIG. 2 illustrates how the magnified character string of an original manuscript (G) is combined with the remaining unchanged characters in the manuscript (S)

FIG. 2 shows an operation for copying manuscript G by changing a magnification/reduction rate for a portion outside the region indicated by broken line $L_{AB}$. In this case, characters of a portion "AB mountain area" indicated by broken line $L_{AB}$ or paper S are reproduced in a one-to-one correspondence with manuscript G, and the other portion is formed at the set magnification/reduction rate.

Figure 3A:
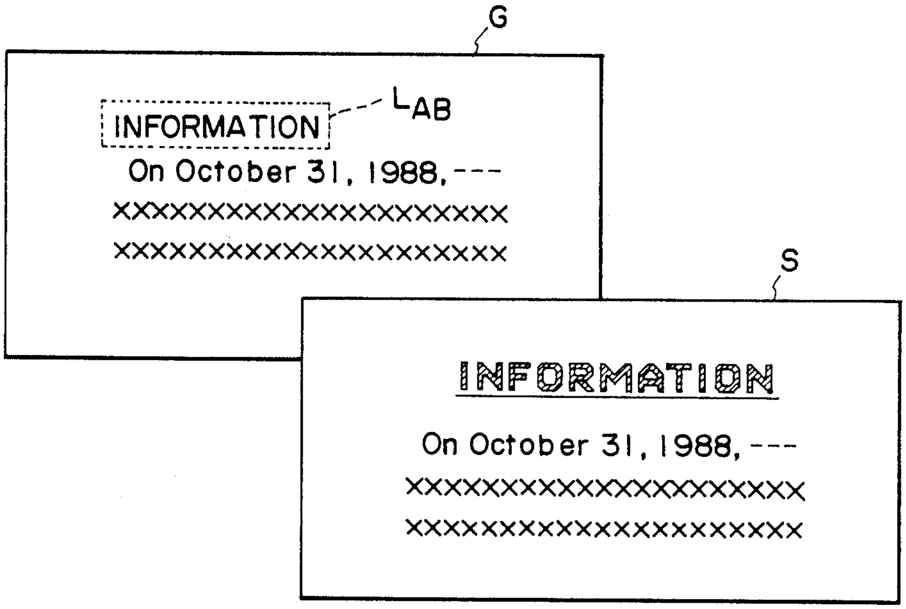
FIG. 3A illustrates how part of characters in an original manuscript (G) is modified and relocated in the manuscript (S)

FIG. 3A shows an operation for copying an image corresponding to a portion inside a region indicated by broken line $L_{AB}$ of manuscript G by changing a magnification/reduction rate for the image and moving an output position of the image to the center of paper S. In this case, characters "INFORMATION" at the portion indicated by broken line $L_{AB}$ on paper S are formed at the center of paper S in accordance with the set magnification/reduction rate, and the other portion is reproduced in a one-to-one correspondence with manuscript G. Note that not only magnification but also reduction can be performed for an image corresponding to designated region $L_{AB}$.

Figure 3B:
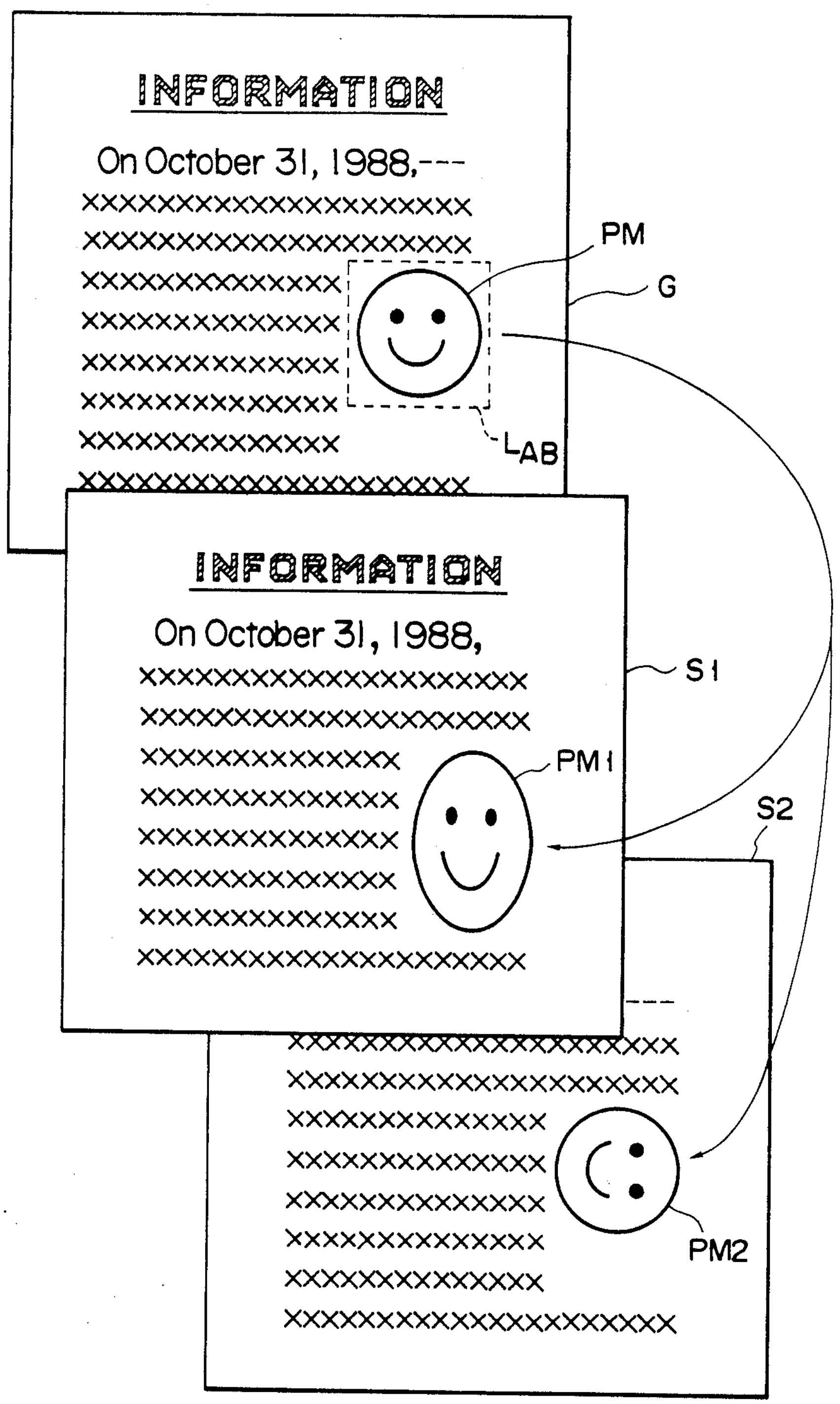
FIG. 3B illustrates how an image of part of original manuscript (G) is modified (Sl) or rotated (S2) in the remaining part of the manuscript (G)

FIG. 3B shows an operation for modifying or rotating a part of an image of manuscript G.

That is, when a space present below peace mark PM in manuscript G is to be filled with peace mark PM, a portion of mark PM is extracted within a range indicated by broken line $L_{AB}$ as in the method described above with reference to FIG. 16. The size of a bit map image of output mark PM is magnified by a predetermined amount in the column direction (Y direction in FIG. 16). Magnified mark PM1 is printed on printing paper S1, and then an image of manuscript G corresponding to a portion non-extracted along broken line $L_{AB}$ is printed on a blank portion of paper S1.

Similarly, in order to change the direction of peace mark PM in manuscript G, a portion of mark PM is extracted along broken line $L_{AB}$. A bit map image of mark PM is subjected to remapping on a VRAM (memory 97 in FIG. 14) so that extracted mark PM is printed on printing paper S2, and a portion of manuscript G non-extracted along broken lines $L_{AB}$ is printing on a blank portion of paper S2.

Figure 17A:
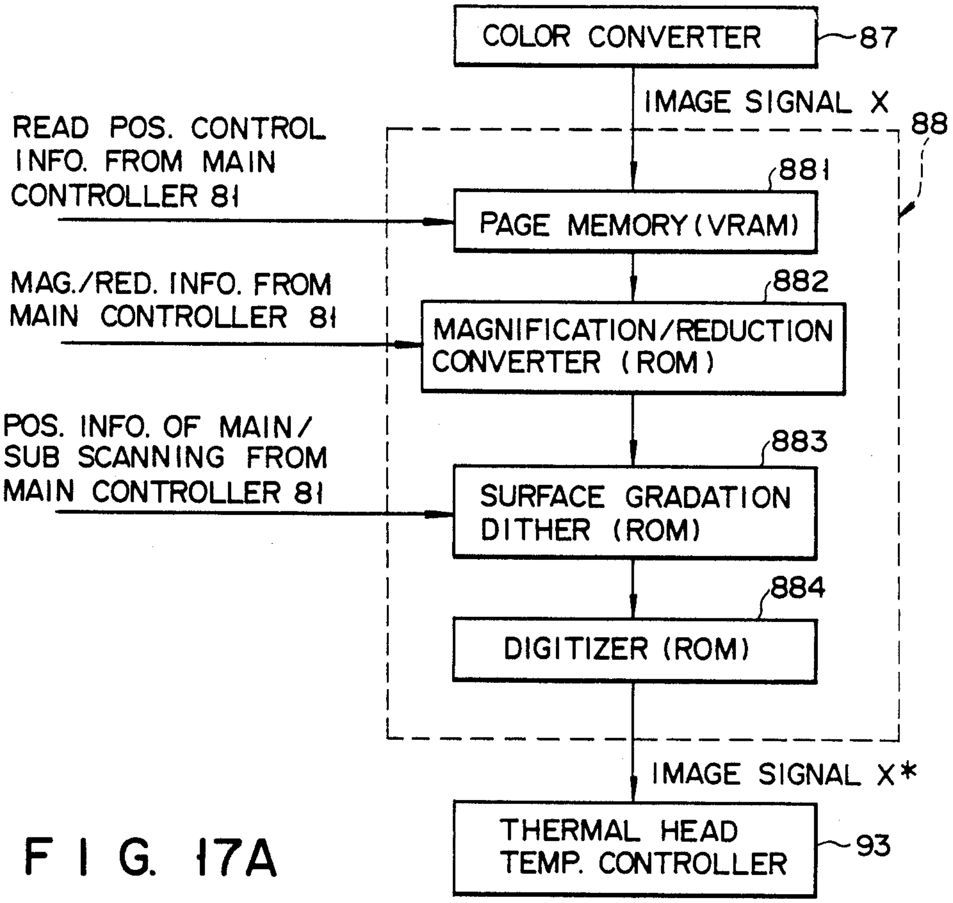
FIG. 17A is a block diagram showing a configuration of the digitizer (88) shown in FIG. 15.

FIG. 17A shows a detailed arrangement of digitizer 88 shown in FIG. 15.

Multi-gradation digital image signal X (one of Y, M, C, and BL) supplied from color converter 87 is temporarily stored in page memory (bit map VRAM) 881 in accordance with read-out position control information (address data) supplied from main controller 81. A bit map image of stored signal X is modified by magnification/reduction converter (data converter ROM) 882 in accordance with magnification/reduction information supplied from main controller 91. That is, when stored signal X is peace mark PM shown in FIG. 3B, for example, and a magnification rate (e.g., ×1.5) in a column direction for mark PM is supplied from controller 81 to converter 882, the bit map image of signal X is not magnified in the X direction but in only the Y direction.

The bit map image magnified in the Y direction has 16 gradations if it is constituted by a 4-bit plane. This magnified bit map image is converted into bit map image data having pseudo gradations based on a surface density change by surface gradation dither ROM 883 using a dither method. In this surface gradation conversion, storage positions (main and sub scanning direction positions) of the converted bit map image are determined in accordance with position information (address data) supplied from main controller 81 to dither ROM 883.

The bit map modified as described above and having the pseudo gradations and the positions is converted into perfect binary data (two gradations) X* by digitizer 884. Data X* is supplied to thermal head temperature controller 93, and peace mark PM1 shown in FIG. 3B, for example, is printed on paper S1 in accordance with data X*. Thereafter, binary image data of characters and the like outside broken line $L_{AB}$ in FIG. 3B is printed on a portion of paper S1 other than the position of mark PM1 shown in FIG. 3B.

Figure 17B:
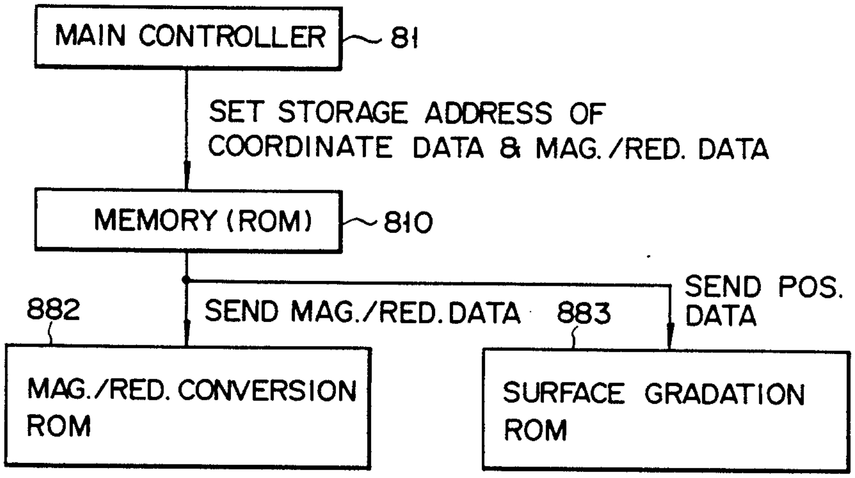
FIG. 17B is a block diagram showing a hardware for handing position data and magnification/reduction data of an image to be processed by the image processor of the invention.

FIG. 17B shows a detailed arrangement of a part of hardware for handling position data and magnification/reduction data to be processed by the image processor according to the present invention. In FIG. 17A, ROMs 882 and 883 are directly controlled by main controller 81. In FIG. 17B, however, memory (ROM) 810 for data conversion is provided between main controller 81 and ROMs 882 and 883.

That is, main controller 81 sets a storage address for coordinate data and magnification/reduction data in memory 810. Memory 810 sends the magnification/reduction data to magnification/reduction conversion ROM 882 and sends the coordinate data (position data in main and subscanning directions) to surface gradation conversion ROM 883. ROM 882 performs magnification/reduction processing for an input bit map image on the basis of the magnification/reduction data, and ROM 883 performs surface gradation conversion processing for the input bit map image on the basis of the coordinate data.

FIG. 18A is a flow chart for explaining an operation of the image processor according to the present invention. First, when the copying machine (FIGS. 4 to 15) according to the embodiment of the present invention is powered on (ST10), the CPUs in controllers 81 to 83 shown in FIG. 14 are initialized (ST12).

Designation of broken line region $L_{AB}$ shown in FIG. 16, for example, is then performed by the switch of region designation section 52 on operation panel 50 shown in FIG. 13 (ST14). That is, when region designation switch $52_1$ is depressed (YES in ST14), indicator LED1 next to switch $52_1$ is turned on, and a region designation mode is started (ST16). In this mode, when row-direction (X-axis) coordinate set mode switch $52_2$ is depressed, indicator LED2 next to switch $52_2$ is turned on, and an X-coordinate set mode is started. Similarly, in the region designation mode, when column-direction (Y-axis) coordinate input mode switch $52_3$ is depressed, indicator LED3 next to switch $52_3$ is turned on, and a Y-coordinate set mode is started.

Figure 18C:
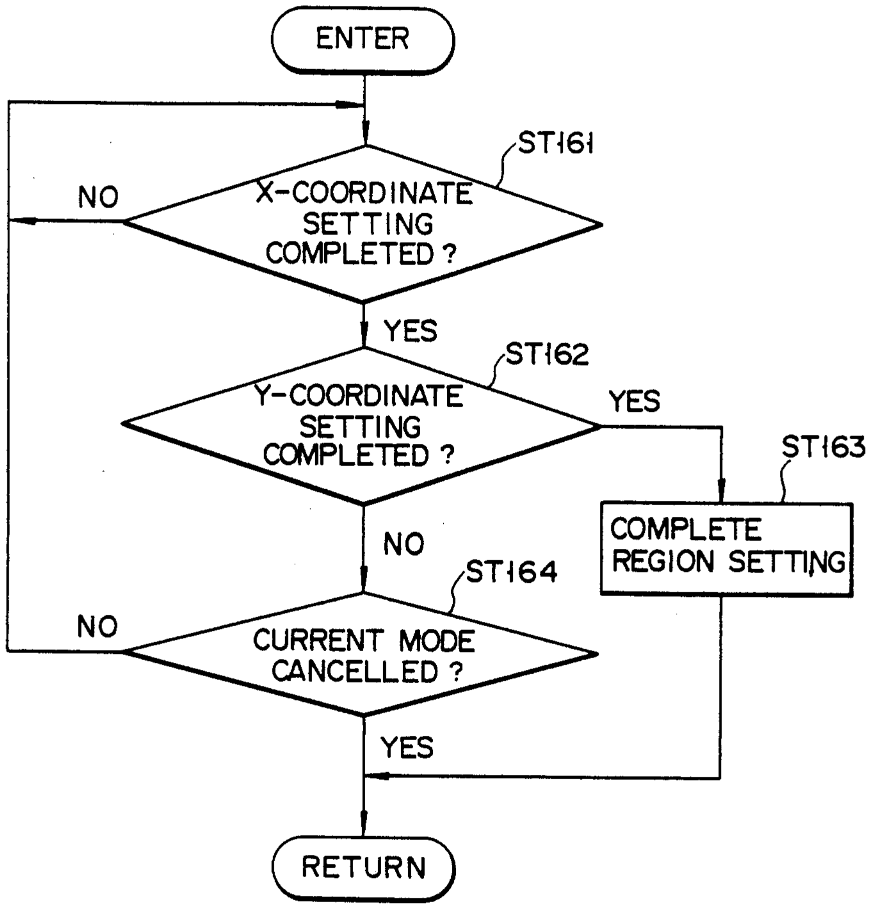
FIG. 18C is a flow chart explaining the X/Y coordinates setting routine shown in FIG. 18A.

FIG. 18C shows an X/Y-coordinates setting subroutine (ST16) for designating region $L_{AB}$. X-coordinates $X_A$ and $X_B$ of diagonal positions A and B in region $L_{AB}$ of manuscript G placed on table 2 shown in FIG. 16 are set by ten keys 50*b* on panel 50 shown in FIG. 13. By depressing set key $52_4$ on panel 50, X-coordinate setting is completed (YES in ST161). Subsequently, Y-coordinates $Y_A$ and $Y_B$ of positions A and B in region $L_{AB}$ are set by ten keys 50*b*. Thereafter, by depressing set key $52_4$, Y-coordinate setting is completed (YES in ST162).

When X- and Y-coordinates $X_A$, $Y_A$, $X_B$, and $Y_B$ of positions A and B are set, region setting for region $L_{AB}$ is completed (ST163), and the subroutine shown in FIG. 18C is ended.

If X-coordinate setting (ST161) and Y-coordinate setting (ST162) are not completed (NO in ST161, NO in ST162, and NO in ST164), the subroutine shown in FIG. 18C is not ended. Note that all clear key 50*f* on operation panel 50 is depressed, a current mode is cancelled (YES in ST164), and this subroutine is ended.

A magnification/reduction rate (magnification or reduction) for region $L_{AB}$ is designated by switch $51_2$ or $51_3$ of magnification/reduction rate setting section 51 on panel 50 shown in FIG. 13 (ST18).

FIG. 18D shows a magnification/reduction setting routine (ST20) shown in FIG. 18A. That is, in order to magnify region $L_{AB}$, switch $51_2$ of section 51 is depressed (YES in ST18), and ten keys **50*b* are continuously operated until a desired magnification rate is displayed on display 50*d*. When the desired magnification rate is displayed on display 50*d*, set key $51_4$ is turned on (YES in ST201), and the subroutine shown in FIG. 18D** is ended.

Similarly, in order to reduce region $L_{AB}$, switch $51_3$ of section 51 is depressed (YES in ST18), and ten keys **50*b* are continuously operated until a desired reduction rate is displayed on display 50*d*. When the desired reduction rate is displayed on display 50*d*, set key $51_4$ is turned on (YES in ST201), and the subroutine in FIG. 18D** is ended.

The subroutine in FIG. 18D is not ended before magnification/reduction rate setting is completed (NO in ST201 and NO in ST202). Note that if all clear key **50*f* on panel 50 or equal magnification key 511 of section 51 is depressed, a current mode is cancelled (YES in ST202**), and this subroutine is ended.

A copy output position of region $L_{AB}$ is designated by operating switches $53_1$ to $53_4$ of output position setting section 53 on operation panel 50 shown in FIG. 13 (YES in ST22).

Figure 18E:
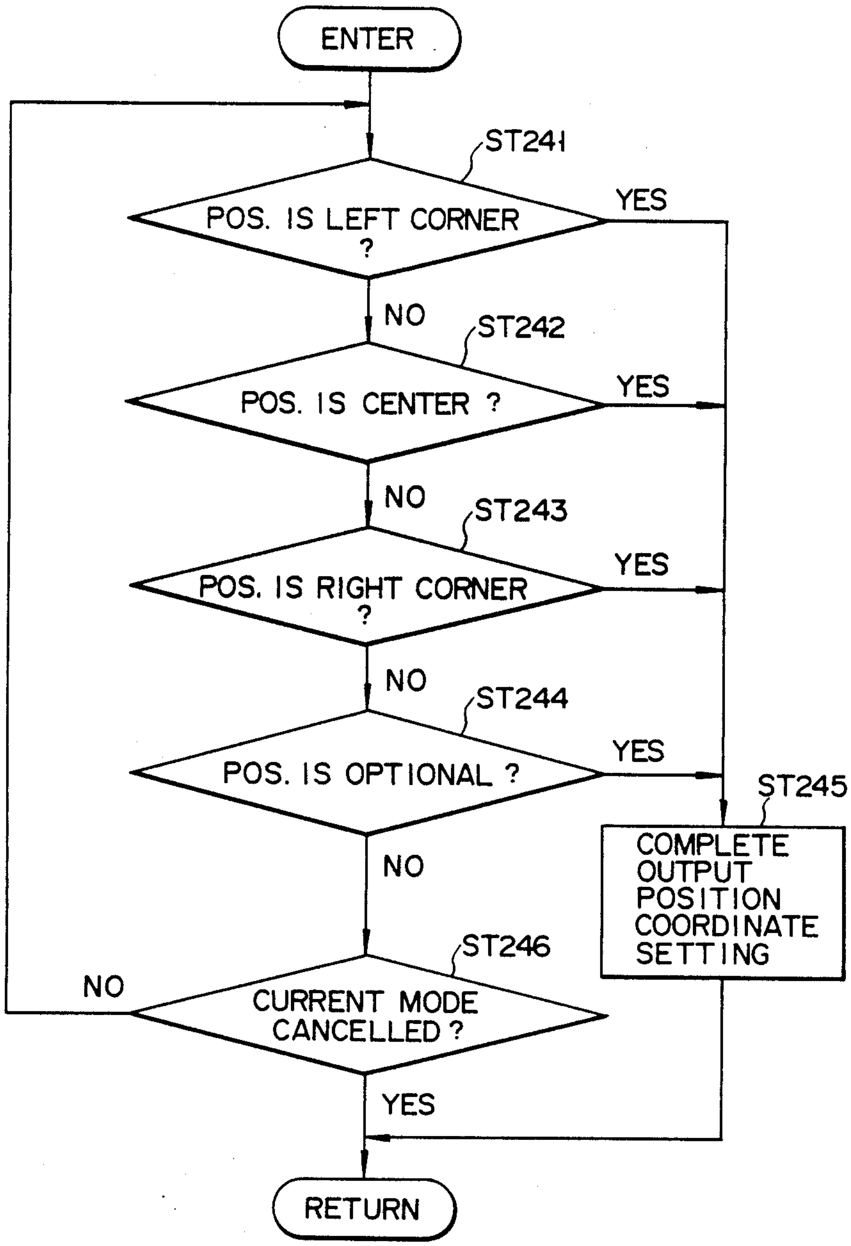
FIG. 18E is a flow chart explaining the output position setting routine shown in FIG. 18A.

FIG. 18E shows an output position setting routine (ST24) shown in FIG. 18A. That is, in order to arrange magnified or reduced region $L_{AB}$ at a left corner of a copy output (copy paper), switch $53_1$ of section 53 is depressed (YES in ST241). In order to arrange region $L_{AB}$ at the center of the copy output, switch $53_2$ of section 53 is depressed (YES in ST242). In order to arrange region $L_{AB}$ at a right corner of the copy output, switch $53_1$ of section 53 is depressed (YES in ST243).

In order to arrange region $L_{AB}$ at an arbitrary position on the copy output, switch $53_4$ of section 53 is depressed (ST244). In this case, a position of region $L_{AB}$ on the copy output is determined by X/Y-coordinate designation using ten keys **50*b* as in X/Y-coordinates setting subroutine in ST16. When the copy output position is set by using the ten keys, set key $52_4$ is depressed (YES in ST244**).

When the copy output position of region $L_{AB}$ is designated (YES in ST241, YES in ST242, YES in ST243, and YES in ST244), coordinate setting for output position is completed (ST245), and the subroutine shown in FIG. 18E is ended.

Note that the subroutine shown in FIG. 18D is not ended before output position setting is completed (NO in ST241, NO in ST242, NO in ST243, NO in ST244, and NO in ST246). Note that if all clear key **50*f* on panel 50 is depressed, a current mode is cancelled (YES in ST246**), and this subroutine is ended.

Horizontal/vertical independent magnification/reduction and rotation of, e.g., mark PM shown in FIG. 3B can be designated by operating switches of output mode setting section 55 on panel 50.

That is, when mode switch 551 is depressed (YES in ST26), an LED next to switch 551 is turned on, and an output mode setting subroutine is started (ST28). In this mode, when horizontal independent magnification/reduction switch 552 is depressed, an LED next to switch 552 is turned on, and a horizontal independent magnification/reduction mode is started. Similarly, in this mode, when vertical independent magnification/reduction switch 553 is depressed, an LED next to switch 553 is turned on, and a vertical independent magnification/reduction mode is started.

FIG. 18F shows an output mode setting routine (ST28) shown in FIG. 18A. In an image (S1) shown at the center of FIG. 3B, mark PM is vertically magnified. In this case, vertical independent magnification/reduction switch 553 is depressed, a magnification rate (e.g., 150%) is input by operating magnification key $51_2$ and ten keys **50*b*, and then set key 559 is turned on to complete independent magnification/reduction rate setting (YES in ST281**).

When this setting operation is finished, magnification/reduction rate setting for mark PM of region $L_{AB}$ is completed (ST283), and the subroutine shown in FIG. 18F is ended.

In an image (S2) shown in the lower portion of FIG. 3B, mark PM is rotated clockwise through 90°. In this case, rotation switch 558 is depressed, 90°-rotation key 554 is turned on, and then set key 559 is turned on to complete 90° -rotation setting (YES in ST282). (In order to rotate mark PM through 180° or 270°, 180°- or 270°-rotation key 555 or 556 may be turned on.)

In order to rotate mark PM through an arbitrary angle, rotation switch 558 is depressed, option key 557 is depressed, and a desired rotational angle is input by ten keys **50*b*. Thereafter, set key 559** is depressed to complete arbitrary angle rotation setting processing.

When this setting operation is finished, rotation setting for mark PM in region $L_{AB}$ is completed (ST283), and the subroutine shown in FIG. 18F is ended.

The subroutine shown in FIG. 18F is not ended before horizontal/vertical independent magnification/reduction setting (ST281) and rotational position setting (ST282) is completed (NO in ST281, NO in ST282, and NO in ST284). Note that all clear key **50*f* on panel 50 is depressed, a current mode is cancelled (YES in ST284**), and this subroutine is ended.

When copy key **50*a* is depressed (YES in ST30) after a predetermined one of the above processing (ST14, ST18, ST22, and ST26), copying is performed in accordance with a predetermined routine (ST32**).

FIG. 18B shows a copy routine (operation software for position and magnification/reduction data). That is, when copying begins (ST321) and its print start mode begins (ST322), main controller 81 reads out the position and magnification/reduction data input from operation panel 50 shown in FIG. 13 and stored in memory 97 (ST323). The readout data is sent to digitizer 88 (ST324), and digitizing processing is performed on the basis of the data (ST325). This digitized data is printed out.

As described above, an image corresponding to an arbitrarily designated region of a single original manuscript can be formed in accordance with an arbitrarily set magnification/reduction rate at an arbitrarily designated position, while an image corresponding to a portion other than the designated region is directly reproduced in a one-to-one correspondence with a manuscript image.

That is, only a part of a single manuscript can be output in an enlarged or reduced scale. Therefore, a copy image can be easily edited without preparing a partially enlarged or reduced manuscript. Therefore, a part of a manuscript image can be extracted and formed by changing its magnification/reduction rate, if necessary, while the manuscript image of the other part is formed in a one-to-one correspondence with a manuscript image, resulting in great convenience.

In the above embodiment, a thermal transfer color copying machine is exemplified. The present invention, however, is not limited to this embodiment. For example, the present invention can be applied to various types of image processors having a magnifying/reducing function such as an electronic copying machine (PPC) using a toner image.

The present invention can be variously modified and carried out without departing from the spirit and scope of the invention.

As has been described above, according to the present invention, there is provided an image processor capable of forming an image of an arbitrarily designated region of a single manuscript in accordance with an arbitrarily set image formation magnification/reduction rate, while reproducing an image of a portion other than the designated region in a one-to-one correspondence with a manuscript image.

While the invention has been described in connection with what is presently considered to be the most practical and preferred embodiment, it is to be understood that the invention is not limited to the disclosed embodiment but, on the contrary, is intended to cover various modifications and equivalent arrangements included within the scope of the appended claims, which scope is to be accorded the broadest interpretation so as to encompass all such modifications and equivalent arrangements.

What is claimed is:

1. An image processing apparatus, comprising:
   means for designating a prescribed region of an image on an original having said prescribed region and a remaining region;
   means for setting at least one of a rate of magnification for an image of said prescribed region, a rate of reduction for the image of said prescribed region, and a rate of a modification for the image of said prescribed region;
   first means for forming the image of said prescribed region on an image forming media in accordance with the rate set by said setting means; and
   second means for forming on said image forming media an image of the remaining region of said original.

2. An image processing apparatus according to claim 1, further comprising:
   means for instructing said setting means to determine a location of the image of said prescribed region in the image forming media.

3. An image processing apparatus according to claim 1, further comprising:
   means for scanning the original to supply and image signal to said second means by which the image signal is used to form the image of said prescribed region.

4. An image processing apparatus according to claim 3, wherein said forming means includes:
   means for producing print data from the image signal from said scanning means; and
   means for printing an image of the print data on said image forming media, the image of said print data being modified by the rate set by said setting means.

5. An image processing apparatus according to claim 4, wherein said producing means includes:
   means for digitizing the image signal from said scanning means to produce said print data.

6. An image processing apparatus according to claim 4, wherein said producing means includes:
   means for converting the image signal from said scanning means into a digital print data having more than two gradations;
   means for digitizing the digital print data to produce said print data having two gradations.

7. An image processing apparatus according to claim 6, wherein said digitizing means includes:
   means for temporarily storing said digital print data;
   means for reading the digital print data stored in said temporarily storing means, and modifying an image pattern defined by the digital print data read out of said temporarily storing means, in accordance with the rate set by said setting means, to produce modified print data;
   means for dithering the modified print data to produce dithered print data; and
   means for digitizing the dithered print data to produce said print data having two gradations.

8. A color printing apparatus having an image processor with partial image size zooming, comprising:
   means for designating a prescribed region of an image on an original;
   means for setting at least one of a rate of a magnification for an image of said prescribed region, a rate of a reduction for the image of said prescribed region, and a rate of a modification for the image of said prescribed region;
   means for forming the image of said prescribed region on a paper media in accordance with the rate set by said setting means;
   means for adding to said paper media an image of the original other than the image of said prescribed region;
   means for scanning the original to supply color image information, obtained by the original scanning, to said adding means by which the color image information is used to form the image of said prescribed region,
   wherein said forming means includes:
   means for producing print data from the image signal from said scanning means; and
   means for printing an image of the print data on said paper media, the image of said print data being modified by the rate set by said setting means.

9. An image processing apparatus according to claim 8, wherein said color image information includes a plurality of color signals, and said producing means includes:
   means for selecting from said color signals one of a yellow signal, a magenta signal, a cyan signal, and a black signal in accordance with contents of given selection data, so that a selected color signal is generated; and
   means for digitizing the selected color signal to produce said print data.

10. An image processing apparatus with partial image size zooming, comprising:
   means for designating a prescribed region of an image on an original having said prescribed region and a remaining region;
   means for setting at least one of a rate of magnification for an image of said prescribed region, a rate of a reduction for the image of said prescribed region, and a rate of a modification for the image of said prescribed region;

means for forming the image of said prescribed region on image forming media in accordance with the rate set by said setting means; and means for directly forming on said image forming media an image of the remaining region of said original.

11. An image processing apparatus according to claim 10, further comprising:

means for instructing said setting means to deter mine a location of the image of said prescribed region in the image forming media.

12. An image processing apparatus according to claim 10, further comprising:

means for scanning the original to supply an image signal, obtained by the original scanning, to said directly forming means by which the image signal is used to form the image of said prescribed region.

13. An image processing apparatus according to claim 12, wherein said forming means includes:

means for producing a print data from the image signal from said scanning means; and means for printing an image of the print data on said image forming media, the image of said print data being modified by the rate set by said setting means.

14. An image processing apparatus according to claim 13, wherein said producing means includes:

means for digitizing the image signal from said scanning means to produce said print data.

15. An image processing apparatus according to claim 13, wherein said producing means includes:

means for converting the image signal from said scanning means into a digital print data having more than two gradations; and means for digitizing the digital print data to produce said print data having two gradations.

16. An image processing apparatus according to claim 15, wherein said digitizing means includes:

means for temporarily storing said digital print data;

means for reading the digital print data stored in said temporarily storing means, and modifying an image pattern defined by the digital print data read out of said temporarily storing means, in accordance with the rate set by said setting means, to produce modified print data;

means for dithering the modified print data to pro duce dithered print data; and means for digitizing the dithered print data to produce said print data having two gradations.

17. A method of partial image size zooming, comprising steps of:

designating a prescribed region of an image on an original having said prescribed region and a remaining region;

setting at least one of a rate of a magnification for an image of said prescribed region, a rate of a reduction for the image of said prescribed region, and a rate of a modification for the image of said prescribed region;

forming the image of said prescribed region on an image forming media in accordance with the rate set by said setting step; and forming on said image forming media an image of the remaining region of said original.

18. A method according to claim 17, further including the step of:

determining a location of the image of said prescribed region in the image forming media.

* * * * *